US012767851B2

(12) United States Patent
Ueyama et al.

(10) Patent No.: US 12,767,851 B2
(45) Date of Patent: Oct. 20, 2026

(54) AQUEOUS DISPERSION OF FLUOROOLEFINS, AQUEOUS DISPERSION OF COPOLYMER OF FLUOROOLEFINS, AND METHOD FOR MANUFACTURING THE SAME

(71) Applicant: ASAHI KASEI KABUSHIKI KAISHA, Tokyo (JP)

(72) Inventors: Hiroyuki Ueyama, Tokyo (JP); Masao Uchigasaki, Tokyo (JP); Ichitaro Harada, Tokyo (JP); Masatsugu Morishita, Tokyo (JP); Masato Ohira, Tokyo (JP); Nozomi Kuramata, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 939 days.

(21) Appl. No.: 17/562,462

(22) Filed: Dec. 27, 2021

(65) Prior Publication Data

US 2022/0228017 A1 Jul. 21, 2022

(30) Foreign Application Priority Data

Dec. 28, 2020 (JP) ................................ 2020-218480
Jun. 29, 2021 (JP) ................................ 2021-107187
Oct. 25, 2021 (JP) ................................ 2021-173658
Nov. 17, 2021 (JP) ................................ 2021-186996

(51) Int. Cl.
*C09D 127/18* (2006.01)
*C08F 2/22* (2006.01)
*C08F 214/26* (2006.01)
*C09D 7/20* (2018.01)

(52) U.S. Cl.
CPC .............. *C09D 127/18* (2013.01); *C08F 2/22* (2013.01); *C08F 214/26* (2013.01); *C09D 7/20* (2018.01)

(58) Field of Classification Search
CPC ...... C09D 127/18; C09D 7/20; C09D 127/12; C08F 2/22; C08F 214/26
See application file for complete search history.

(56) References Cited

U.S. PATENT DOCUMENTS 3,528,954 A 9/1970 Carlson
4,138,426 A 2/1979 England
4,267,364 A 5/1981 Grot et al.
4,415,679 A 11/1983 Grot
5,281,680 A 1/1994 Grot
6,555,639 B2 4/2003 Apostolo et al.
6,642,307 B1 11/2003 Sogabe et al.
8,344,192 B2 1/2013 Isaka et al.
8,404,790 B2 * 3/2013 Hintzer .................. C08F 14/18 526/214
2007/0141425 A1 6/2007 Arase et al.
2009/0061280 A1 3/2009 Ino et al.
2009/0281241 A1 * 11/2009 Brothers ................ C08L 71/02 524/758
2010/0160531 A1 6/2010 Leffew et al.
2012/0157646 A1 6/2012 Imoto et al.
2014/0073709 A1 3/2014 Hattori et al.
2014/0080930 A1 3/2014 Fukunaga et al.
2015/0197589 A1 7/2015 Merlo et al.
2019/0375866 A1 12/2019 Yotsumoto et al.
2020/0199259 A1 6/2020 Chen et al.

FOREIGN PATENT DOCUMENTS

CN 102482363 A 5/2012
CN 107778412 A 3/2018
JP S57-92026 A 6/1982
JP S60-56722 B 12/1985
JP S62-288615 A 12/1987
(Continued)

OTHER PUBLICATIONS

JP2009227754A machine translation (Year: 2009).*
(Continued)

*Primary Examiner* — Mark Eashoo
*Assistant Examiner* — Caitlin Norine Illing
(74) *Attorney, Agent, or Firm* — GREENBLUM & BERNSTEIN, P.L.C.

(57) ABSTRACT

[Problem to be Solved]
Provided are an aqueous dispersion of a fluoroolefin and the like that do not corrode vessels and enable a copolymer to be given at a high conversion ratio and high productivity from the fluoroolefin as a raw material monomer.
[Solution]
An aqueous dispersion containing:
a fluoroolefin (a) represented by the following general formula (1);
a surfactant (c) represented by the following general formula (2); and
a dispersion medium containing water,
wherein the aqueous dispersion has a cumulant diameter of 250 to 2,000 nm, and
the aqueous dispersion has a pH of 2.0 to 7.0:

$$CF_2{=}CF{-}[O{-}CF_2{-}CF(CF_3)]_n{-}O{-}[CF_2]_m{-}Z \quad (1)$$

wherein n represents an integer of 0 or more and 2 or less, m represents an integer of 2 or more and 4 or less, and Z represents $CF_3$, $SO_2F$, or $COOH_3$, and $$CF_3{-}[CF_2]_m{-}O{-}[CF(CF_3){-}CF_2{-}O]_n{-}CF(CF_3){-}Z \quad (2)$$

wherein m represents an integer of 0 to 2, n represents an integer of 0 to 6, Z represents COOM, wherein N represents H, Li, Na, K, or $NR_4$, wherein R represents H or a linear alkyl group having 1 to 4 carbon atoms.

9 Claims, No Drawings

(56) References Cited

FOREIGN PATENT DOCUMENTS

| | | | | | |
|---|---|---|---|---|---|
| JP | S62-288617 | A | | 12/1987 | |
| JP | H06-322034 | | | 11/1994 | |
| JP | H07-252322 | A | | 10/1995 | |
| JP | 2003-119204 | A | | 4/2003 | |
| JP | 2005-179447 | A | | 7/2005 | |
| JP | 2006-173098 | A | | 6/2006 | |
| JP | 2009227754 | A | * | 10/2009 | |
| JP | 2012-513532 | A | | 6/2012 | |
| JP | 5075307 | B | | 11/2012 | |
| JP | 2013-529716 | A | | 7/2013 | |
| JP | 5332617 | B | | 11/2013 | |
| JP | 2014-227421 | A | | 12/2014 | |
| JP | 2018-065992 | A | | 4/2018 | |
| JP | 2022-014442 | A | | 1/2022 | |
| WO | 2000/022002 | A | | 4/2000 | |
| WO | 2005/054363 | A1 | | 6/2005 | |
| WO | 2007/089017 | A1 | | 8/2007 | |
| WO | WO-2010038902 | A1 | * | 4/2010 | ............. C07C 51/60 |
| WO | 2012/000851 | A | | 1/2012 | |
| WO | 2012/157715 | A | | 11/2012 | |
| WO | 2012/157714 | A | | 7/2014 | |
| WO | 2019/055791 | A | | 3/2019 | |
| WO | WO-2020105671 | A1 | * | 5/2020 | ........... C09D 133/16 |

OTHER PUBLICATIONS

Malvern Instruments Worldwide, Dynamic Light Scattering Common Terms Defined, 2011, p. 1-5 (Year: 2011).*
WO2020105671A1 machine translation (Year: 2020).*

* cited by examiner

AQUEOUS DISPERSION OF FLUOROOLEFINS, AQUEOUS DISPERSION OF COPOLYMER OF FLUOROOLEFINS, AND METHOD FOR MANUFACTURING THE SAME

TECHNICAL FIELD

The present invention relates to an aqueous dispersion of a fluoroolefin, an aqueous dispersion of a copolymer of fluoroolefin, and a method for producing thereof.

BACKGROUND ART

First Background Art

Functional group-containing perfluorocarbon copolymers are often used as base materials for cation exchange membranes for salt electrolysis, membranes for fuel cells, and the like. As such functional group-containing perfluorocarbon copolymers, sulfonic acid-type functional group-containing perfluorocarbon copolymers are useful.

For example, in a cation exchange membrane electrolysis method of sodium chloride, providing a layer having a carboxylic acid-type cation exchange group, obtained by converting the functional group of a carboxylic acid-type functional group-containing perfluorocarbon copolymer into a cation exchange group, on the side of the cathode chamber of a membrane and providing a layer having a sulfonic acid-type cation exchange group, obtained by converting the functional group of a sulfonic acid-type functional group-containing perfluorocarbon copolymer into a cation exchange group, on the side of the anode chamber of the membrane is known to be effective for production of high-purity caustic soda and to provide high current efficiency and a low electrolytic voltage. With respect to this production technique of a sulfonic acid-type functional group-containing perfluorocarbon copolymer, techniques both in aqueous systems and non-aqueous systems have been revealed.

Production techniques in non-aqueous systems are described in, for example, Patent Literatures 1 to 5, and methods for producing a sulfonic acid-type functional group-containing fluoroolefin copolymer in an aqueous system are described in, for example, Patent Literatures 6 to 9.

Second Background Art

Examples of various known electrochemical apparatuses in which an electrolyte is employed as the ion exchange membrane include alkali metal salt electrolyzers, water electrolyzers, hydrochloric acid electrolyzers, and fuel cells. Of these, electrolysis using an alkali metal salt electrolyzer is mature as an industrial process and widely utilized.

Conventionally, industrial methods for producing halogen gas such as chlorine, caustic alkali, and hydrogen by electrolyzing an aqueous solution of an alkali metal salt, particularly, sodium chloride, potassium chloride, or the like, have been well known. In these industrial methods, electrolysis techniques using an ion exchange membrane as the membrane are globally industrialized as techniques that reduce power consumption and are useful for energy saving.

As ion exchange membranes for use in an alkali chloride electrolysis method of electrolyzing an aqueous alkali chloride solution such as seawater to produce an alkali hydroxide and chlorine, membranes are known which are made of a fluorine-containing copolymer having a carboxylic acid-type functional group or a sulfonic acid-type functional group.

The fluorine-containing copolymer is obtained by copolymerizing a fluorine-containing monomer having a carboxylic acid-type functional group or a sulfonic acid-type functional group with a fluorine-containing olefin.

Examples of the method for polymerizing such a fluorine-containing copolymer include an emulsion polymerization method, a solution polymerization method, a suspension polymerization method, and a bulk polymerization method.

Low polymers having a low molecular weight (oligomers) remain in polymers obtained by these polymerization methods, and it is thus necessary to reduce such oligomers. As methods for reducing low polymers contained in a fluorine-containing copolymer, methods of washing the fluorine-containing copolymer are known (e.g., see Patent Literatures 10 and 11).

There is no description on low polymers (oligomers), but there are known techniques for conducting treatment that allows an ionic group(s) in a polymer to have a stable structure (e.g., see Patent Literature 12).

CITATION LIST

Patent Literature

[Patent Literature 1] Japanese Patent Laid-Open No. 57-92026

[Patent Literature 2] U.S. Pat. No. 3,528,954

[Patent Literature 3] JPH06-322034

[Patent Literature 4] U.S. Pat. No. 4,138,426

[Patent Literature 5] U.S. Pat. No. 4,267,364

[Patent Literature 6] Japanese Patent No. 5075307

[Patent Literature 7] Japanese Patent Laid-Open No. 62-288615

[Patent Literature 8] Japanese Patent Laid-Open No. 62-288617

[Patent Literature 9] Japanese Patent No. 5332617

[Patent Literature 10] International Publication No. WO2012/157714

[Patent Literature 11] International Publication No. WO2012/000851

[Patent Literature 12] Japanese Patent No. 1332757

SUMMARY OF INVENTION

Technical Problem

First Problem

With the methods described in above Patent Literatures 1 to 5, the viscosity of the system rapidly increases as polymerization proceeds, and from the viewpoint of heat removal, it is difficult to achieve a high conversion rate on an industrial scale. With the method described in Patent Literature 6, the sulfonic acid-type functional group is easily hydrolyzed, a fluoroolefin copolymer having hydrolyzed sulfonic acid-type functional group to be given will have smaller melt-moldability. Thus, with conventionally known common processes, bubbling and the like occur, and no homogeneous and favorable film will be formed. This presents a problem particularly in formation of thin films useful in industrial applications. With the methods described in Patent Literatures 7 and 8, in addition to the problem of hydrolysis of the sulfonic acid-type functional group described above, it is difficult to convert the fluoroolefin as raw material at high conversion rate with the copolymer composition ratio kept constant, and it is difficult to increase the copolymer concentration in the aqueous dispersion. With the method described in Patent Literature 9, although hydrolysis of the sulfonic acid-type functional group can be suppressed, highly corrosion-resistant hastelloy or glass lining is essential for the equipment from the viewpoint of corrosion of vessels. Moreover, $C_8F_{17}COONH_4$, which is employed as an emulsifier, is not preferable for environmental reasons.

The present invention has been made in view of the above problems, and a first object is to provide an aqueous dispersion of a fluoroolefin and the like that do not corrode vessels and enable a copolymer to be given at a high conversion ratio and high productivity from the fluoroolefin as the raw material monomer.

Second Problem

According to researches by the present inventors, it has been found that, if a fluorine-containing copolymer entrains a specific low-molecular compound such as the low-molecular polymer (oligomer), bubbling occurs during thermal film formation of the fluorine-containing copolymer, and on laminating a film of the fluorine-containing copolymer with another film, delamination called "delami" occurs at the interface.

When the low-molecular compound has an ionic group, it has been found that, during melt molding, pyrolysis results in coloration, and moisture in air that has been absorbed causes further bubbling.

Both the techniques described in Patent Literatures 10 and 11 perform washing and removal of a low-molecular compound and use fluorine solvents that have a large fear of destroying the ozone layer and that may be restricted in the future, on the washing and removal, thus having a problem of being inappropriate from the viewpoint of environmental loads. Particularly, in the method described in Patent Literature 10, the fluorine-containing copolymer is washed only with a fluorine solvent. Thus, the loss of the polymer itself is large to result in a decrease in the yield, the polymer is partially gelled to markedly degrade the filterability, and the productivity decreases. As a result, the method described in Patent Literature 10 has a problem of difficulty in sufficiently reducing the amount of an oligomer entrained by a desired polymer.

The technique described in Patent Literature 11, in which a polymer obtained by emulsion polymerization is washed with a fluorine solvent, requires once drying the polymer after washing with water and pelletizing the dried polymer, having problems of complicated operations, high costs, and further, difficulty in sufficiently reducing the low-molecular compound.

In the technique described in Patent Literature 12, esterifying the ionic group of the polymer allows the polymer to have a stable structure. At this time, the unstable terminal of the low-molecular compound is simultaneously stabilized, and thus, bubbling is expected to be suppressed. However, the method described in Patent Literature 12 cannot sufficiently reduce the amount of the low-molecular compound and has a problem of difficulty in suppressing delamination of an ion exchange membrane.

Accordingly, in the present invention, in view of the aforementioned problems of conventional art, a second object is to provide a fluorine polymer composition that can suppress bubbling on film formation and delamination on preparation of a laminated membrane, and an ion exchange membrane.

Solution to Problem

With respect to the first problem, the present inventors have conducted diligent research and, as a result, have found that an aqueous dispersion having a predetermined composition and physical properties may solve the above problems, having accomplished the present invention.

With respect to the second problem, the present inventors have conducted diligent research to solve the above problem and, as a result, have found that the above problems may be solved by stabilizing the terminal structure of a specific low-molecular compound having foamability in the fluorine copolymer composition and defining the content of the low-molecular compound itself to a predetermined value or less, having accomplished the present invention.

That is to say, the present invention encompasses aspects as follows.

[1-1]

An aqueous dispersion comprising:

a fluoroolefin (a) represented by the following general formula (1);

a surfactant (c) represented by the following general formula (2); and a dispersion medium comprising water, wherein the aqueous dispersion has a cumulant diameter of 250 to 2,000 nm, and the aqueous dispersion has a pH of 2.0 to 7.0:

$$CF_2{=}CF{-}[O{-}CF_2{-}CF(CF_3)]_n{-}O{-}[CF_2]_m{-}Z \quad (1)$$

wherein n represents an integer of 0 or more and 2 or less, m represents an integer of 2 or more and 4 or less, and Z represents $CF_3$, $SO_2F$, or $COOCH_3$, and $$CF_3{-}[CF_2]_m{-}O{-}[CF(CF_3){-}CF_2{-}O]_n{-}CF(CF_3){-}Z \quad (2)$$

wherein m represents an integer of 0 to 2, n represents an integer of 0 to 6, Z represents COOM, wherein M represents H, Li, Na, K, or $NR_4$, wherein R represents H or a linear alkyl group having 1 to 4 carbon atoms.

[1-2]

The aqueous dispersion according to [1-1], wherein the dispersion medium has a GWP of less than 1,000.

[1-3]

The aqueous dispersion according to [1-1] or [1-2], wherein the fluoroolefin (a) comprises at least one fluoroolefin (a') selected from $CF_2{=}CF{-}O{-}CF_2{-}CF_2{-}SO_2F$, $CF_2{=}CF{-}O{-}CF_2{-}CF_2{-}CF_2{-}CF_2{-}SO_2F$, $CF_2{=}CF{-}O{-}CF_2{-}CF(CF_3){-}O{-}CF_2{-}CF_2{-}SO_2F$, $CF_2{=}CF{-}O{-}CF_2{-}CF(CF_3){-}O{-}CF_2{-}CF_2{-}CF_3$, and $CF_2{=}CF{-}O{-}CF_2{-}CF(CF_3){-}O{-}CF_2{-}CF_2{-}COOCH_3$, and a content of the fluoroolefin (a') is 15 to 40 mass %.

[1-4]

The aqueous dispersion according to any of [1-1] to [1-3], wherein the surfactant (c) comprises $CF_3{-}CF_2{-}CF_2{-}O{-}CF(CF_3){-}CF_2{-}O{-}CF(CF_3){-}COOM$ or $CF_3{-}CF_2{-}CF_2{-}O{-}CF(CF_3){-}CF_2{-}O{-}CF(CF_3){-}CF_2{-}O{-}CF(CF_3){-}CF_2{-}O{-}CF(CF_3){-}CF_2{-}O{-}CF(CF_3){-}COOM$, wherein M represents H, Li, Na, K, or $NR_4$, wherein R represents H or a linear alkyl group having 1 to 4 carbon atoms.

[1-5]

The aqueous dispersion according to any of [1-1] to [1-4], wherein a content of $M_1OOCCF_2SO_3M_2$, wherein $M_1$ and $M_2$ each independently represent H, Li, Na, K or $NR_4$, wherein R represents H or a linear alkyl group having 1 to 4 carbon atoms, in the aqueous dispersion is 100 ppm or less.

[1-6]

The aqueous dispersion according to any of [1-1] to [1-5], wherein a total amount of $Fe^{2+}$ and $Fe^{3+}$ in the aqueous dispersion is 1 ppm or less, and an amount of dissolved oxygen in the first aqueous dispersion is 1 ppm or less.

[1-7]

The aqueous dispersion according to any of [1-1] to [1-6], wherein a value obtained by dividing a volume average particle size of the aqueous dispersion by a number average particle size thereof is 2.0 or less.

[1-8]

An aqueous dispersion comprising:

a copolymer of a fluoroolefin (a) represented by the following general formula (1) and a fluoroolefin (b) represented by the following general formula (3);

a surfactant (c) represented by the following general formula (2); and a dispersion medium comprising water, wherein a content of the surfactant (c) is 0.5% or more and 5.0% or less relative to the copolymer, and wherein the aqueous dispersion has a solid content concentration of more than 18 mass %:

$$CF_2{=}CF{-}[O{-}CF_2{-}CF(CF_3)]_n{-}O{-}[CF_2]_m{-}Z \quad (1)$$

wherein n represents an integer of 0 or more and 2 or less, m represents an integer of 2 or more and 4 or less, and Z represents $CF_3$, $SO_2F$, or $COOCH_3$, $$CF_3{-}[CF_2]_m{-}O{-}[CF(CF_3){-}CF_2{-}O]_n{-}CF(CF_3){-}Z \quad (2)$$

wherein m represents an integer of 0 to 2, n represents an integer of 0 to 6, Z represents COOM, wherein M represents H, Li, Na, K, or $NR_4$, wherein R represents H or a linear alkyl group having 1 to 4 carbon atoms, and $$CX_1X_2{=}CX_3X_4 \quad (3)$$

wherein $X_1$, $X_2$, $X_3$, and $X_4$ each represent H, F, or $CF_3$.

[1-9]

The aqueous dispersion according to [1-8], wherein an absolute value of the zeta potential to be measured for the aqueous dispersion is more than 25 mV.

[1-10]

The aqueous dispersion according to [1-8] or [1-9], wherein the aqueous dispersion has a cumulant diameter of 10 to 300 nm.

[1-11]

The aqueous dispersion according to any of [1-8] to [1-10], wherein the aqueous dispersion has a pH of 2.0 to 7.0.

[1-12]

The aqueous dispersion according to any of [1-8] to [1-11], wherein the dispersion medium has a GWP of less than 1,000.

[1-13]

The aqueous dispersion according to any of [1-8] to [1-12], wherein the fluoroolefin (b) comprises tetrafluoroethylene.

[1-14]

A method for producing the aqueous dispersion according to any of [1-1] to [1-7], comprising:

an emulsification step of shearing a mixed solution comprising water, the surfactant (c), and the fluoroolefin (a) at a peripheral velocity of 20 to 50 m/s.

[1-15]

The production method according to [1-14], wherein, in the emulsification step, an oxygen concentration in an atmosphere is set to 0.1% or less, and a solution temperature of the mixed solution is set to 20° C. or less.

[1-16]

A method for producing the aqueous dispersion according to any of [1-8] to [1-13], as a second aqueous dispersion, from the aqueous dispersion according to any of [1-1] to [1-7], as a first aqueous dispersion, comprising:

a polymerization step of subjecting a polymerization initiator, the first aqueous dispersion, and the fluoroolefin (b) to polymerization to thereby obtain the second aqueous dispersion.

[1-17]

The production method according to [1-16], wherein, in the polymerization step, an emulsified solution comprising the polymerization initiator and the first aqueous dispersion has a pH of 2.0 to 7.0, a polymerization temperature is 0 to 90° C., and a polymerization pressure is 0.0 to 2.0 MPaG.

[2-1]

A fluorine copolymer composition comprising:

a fluorine copolymer (A) having a unit (a) derived from a perfluorovinyl compound having a sulfonyl group and a unit (b) derived from a fluoroolefin; and a low-molecular compound (B) having a functional group represented by —COOX, wherein X is $CH_3$ or $CH_2CH_3$, wherein a content of the low-molecular compound (B) is 700 ppm or less based on a mass of the fluorine copolymer composition.

[2-2]

The fluorine copolymer composition according to [2-1], further comprising a low-molecular compound (C) having a functional group represented by —COOX, wherein X is H, $NH_4$, or a monovalent metal ion, wherein a content of the low-molecular compound (C) is 5 to 250 ppm based on the mass of the fluorine copolymer composition.

[2-3]

The fluorine copolymer composition according to [2-1] or [2-2], wherein a content of the low-molecular compound (B) is 10 to 500 ppm.

[2-4]

A method for producing the fluorine copolymer composition according to any one of [2-1] to [2-3], comprising:

a step of bringing the fluorine copolymer composition in a solvent- or water-containing state into contact with an ortho ester or an alcohol.

[2-5]

The method for producing the fluorine copolymer composition according to [2-4], wherein the fluorine copolymer composition in a solvent- or water-containing state has a solvent content or water content of 5 to 50 mass %.

[2-6]

The method for producing the fluorine copolymer composition according to [2-4] or [2-5], comprising:

a step of emulsion polymerizing a fluoroolefin and a perfluorovinyl compound having a sulfonyl group to thereby obtain the fluorine copolymer (A).

[2-7]

An ion exchange membrane, comprising the fluorine copolymer composition according to any one of [2-1] to [2-3].

Advantageous Effects of Invention

First Effect

The present invention can provide an aqueous dispersion of a fluoroolefin and the like that do not corrode vessels and enable a copolymer to be given at a high conversion ratio and high productivity from a fluoroolefin as the raw material monomer.

Second Effect

The present invention can provide a fluorine polymer composition that can suppress bubbling on film formation and delamination on preparation of a laminated membrane, and an ion exchange membrane.

DESCRIPTION OF EMBODIMENTS

Hereinbelow, an embodiment for carrying out the present invention will now be described in detail. The present invention is not limited to the present embodiment below, and can be carried out after making various modifications within the scope of the present invention. The notation "to" as used herein means that a numeral before or after it is included as the lower limit or upper limit, unless otherwise indicated.

The definitions of the terms given below shall apply throughout the specification and the appended claims.

The term "monomer" means a polymerization-reactive compound having a carbon-carbon double bond.

The term "ionic group" means an ionic functional group itself or a functional group that may be converted into sulfonic acid or carboxylic acid by hydrolysis or neutralization.

The term "sulfonic acid-type functional group" means a sulfonic acid group ($—SO_3H$) itself or a functional group that may be converted into a sulfonic acid group by hydrolysis or neutralization.

The term "carboxylic acid-type functional group" means a carboxyl group (—COOH) itself or a functional group that may be converted into a carboxyl group by hydrolysis or neutralization.

First Embodiment

A first aspect according to the present embodiment (also referred to as "first embodiment" herein) now will be described in detail. The terms and symbols used in the first embodiment are used independently from the content of a second embodiment mentioned below.

[Aqueous Dispersion]

(First Aqueous Dispersion)

An aqueous dispersion according to a first aspect (also referred to as the "first aqueous dispersion" herein) in the present embodiment (hereinbelow, unless otherwise indicated, "the present embodiment" in the section of <<First Embodiment>> means the first embodiment.) is an aqueous dispersion including a fluoroolefin (a) represented by the following general formula (1), a surfactant (c) represented by the following general formula (2), and a dispersion medium comprising water, wherein the aqueous dispersion has a cumulant diameter of 250 to 2,000 nm, and the aqueous dispersion has a pH of 2.0 to 7.0:

$$CF_2{=}CF—[O—CF_2—CF(CF_3)]_n—O—[CF_2]_m—Z \quad (1)$$

wherein n represents an integer of 0 or more and 2 or less, m represents an integer of 2 or more and 4 or less, and Z represents $CF_3$, $SO_2F$, or $COOCH_3$, and $$CF_3—[CF_2]_m—O—[CF(CF_3)—CF_2—O]_n—CF(CF_3)—Z \quad (2)$$

wherein m represents an integer of 0 to 2, n represents an integer of 0 to 6, Z represents COOM, wherein M represents H, Li, Na, K, or $NR_4$, wherein R represents H or a linear alkyl group having 1 to 4 carbon atoms.

The first aqueous dispersion, configured as described above, does not corrode vessels and enables a copolymer to be given at a high conversion ratio from the fluoroolefin as the raw material monomer.

In the first aqueous dispersion, the fluoroolefin (a) is finely-divided by the surfactant (c). That is, the first aqueous dispersion is configured such that fine particles (dispersoid) derived from the fluoroolefin (a) are dispersed in the dispersion medium comprising water. The particle size of the first aqueous dispersion is expressed as the cumulant diameter. The cumulant diameter of the first aqueous dispersion is 250 to 2,000 nm, preferably 250 to 1500 nm. The fluoroolefin (a) has a specific gravity greatly different from that of water and extremely easily precipitates. Thus, when the above cumulant diameter exceeds 2,000 nm, oil droplets derived from the fluoroolefin (a) precipitate and coalesce, and two-layer separation occurs. When the above cumulant diameter is less than 250 nm, the total surface area of the fluoroolefin (a) is enlarged to increase the frequency of contact with water, and then the fluoroolefin (a) may be hydrolyzed.

The above cumulant diameter can be measured by a method described in examples mentioned below.

For example, conducting an emulsification step mentioned below or the like enables the above cumulant diameter to fall within the above range.

The first aqueous dispersion is intended to have a pH of 2.0 to 7.0, has more preferably a pH of 2.0 to 6.9, still more preferably a pH of 2.2 to 6.7. When the pH exceeds 7.0, the fluoroolefin (a) is hydrolyzed. When the pH is less than 2.0, the stability of the particles derived from the fluoroolefin (a) decreases to cause the particles to precipitate and coalesce. Alternatively, metal ions such as iron ions are eluted from the reaction tank to facilitate decomposition of the polymerization initiator, and thus the copolymerization reaction may become difficult to control.

For adjustment of the pH of the first aqueous dispersion, a pH adjusting agent may be used. As a pH adjusting agent optionally contained in the first aqueous dispersion, those conventionally known and used can be widely used. For example, employed is an inorganic acid such as nitric acid, sulfuric acid, or phosphoric acid, an organic acid such as trifluoromethanesulfonic acid or trifluoroacetic acid, or a buffering agent such as phosphoric acid/sodium dihydrogen phosphate, or sodium dihydrogen phosphate/disodium hydrogen phosphate.

The content of the pH adjusting agent in the first aqueous dispersion is not particularly limited and can be set to 0.01 to 150 mM. The pH adjusting agent is used preferably in the range of 0.01 to 50 mM. When the content of the pH adjusting agent is 150 mM or less, there is a tendency that finely-divided dispersed oil droplets derived from the fluoroolefin (a) are stabilized and coalescence and precipitation of the oil droplets are preferably prevented. The pH adjusting agent is preferably added before the fluoroolefin (a) is finely-divided and dispersed.

The term "GWP" herein means a global warming potential, and referring to Federal Register/Vol. 78, No. 66 can identify the value of each substance. In the present embodiment, from the viewpoint of the influence on the global environment, the GWP of the dispersion medium in the first aqueous dispersion is preferably less than 1,000. Examples of the dispersion medium include, but are not particularly limited to, methanol, in addition to water. When a substance other than water is contained as a dispersion medium in the first aqueous dispersion, the GWP of each dispersion medium is preferably less than 1,000. The first aqueous dispersion preferably does not substantially include components having a GWP of 1,000 or more. The phrase "not substantially include" means that the content of the component(s) having a GWP of 1,000 or more in the first aqueous dispersion is less than 100 ppm.

As the fluoroolefin (a) in the first aqueous dispersion, any known and used compound can be used as long as the compound satisfies the above general formula (1). From the viewpoint of industrial productivity, at least one fluoroolefin (a') selected from $CF_2$=CF—O—$CF_2$—$CF_2$—$SO_2$F, $CF_2$=CF—O—$CF_2$—$CF_2$—$CF_2$—$CF_2$—$SO_2$F, $CF_2$=CF—O—$CF_2$—CF($CF_3$)—O—$CF_2$—$CF_2$—$SO_2$F, $CF_2$=CF—O—$CF_2$—CF($CF_3$)—O—$CF_2$—CF($CF_3$)—O—$CF_2$—$CF_2$—$SO_2$F, $CF_2$=CF—O—$CF_2$—CF($CF_3$)—O—$CF_2$—$CF_2$—$CF_3$, $CF_2$=CF—O—$CF_2$—$CF_2$—$COOCH_3$, $CF_2$=CF—O—$CF_2$—$CF_2$—$CF_2$—$COOCH_3$, and $CF_2$=CF—O—$CF_2$—CF($CF_3$)—O—$CF_2$—$CF_2$—$COOCH_3$ is preferably included.

As the fluoroolefin (a), those mentioned above may be used singly or in combinations of two or more.

The content of the fluoroolefin (a) in the first aqueous dispersion is preferably 5 mass % to 40 mass %, more preferably 15 mass % to 40 mass %, still more preferably 15 mass % to 33 mass %, based on 100 mass % of the first aqueous dispersion. When the proportion of the fluoroolefin (a) is 40 mass % or less, there is a tendency that the oil droplets of the monomer precipitate and coalesce and are more unlikely to separate from water, and additionally hydrolysis of the fluoroolefin (1) during emulsification treatment is unlikely to occur. When the proportion of the fluoroolefin (a) is 5 mass % or more, there is a tendency that the reaction apparatus and equipment for separation and collection of copolymer can be reduced in size and this size reduction is advantageous in respect of work operations. In the present embodiment, from the viewpoint as described above, the content of the fluoroolefin (a') is preferably 5 mass % to 40 mass %, more preferably 15 mass % to 40 mass %, still more preferably 15 mass % to 33 mass %, based on 100 mass % of the first aqueous dispersion.

As the surfactant (c) in the first aqueous dispersion, any known and used compound can be used as long as the compound satisfies the above general formula (2). From the viewpoint of the affinity to the monomer in the first aqueous dispersion and suppression of chain transfer reaction, which is a side reaction on polymerization, perfluoro surfactants such as $CF_3$—O—CF($CF_3$)—$CF_2$—O—CF($CF_3$)—COOM, $CF_3$—$CF_2$—$CF_2$—O—CF($CF_3$)—$CF_2$—O—CF($CF_3$)—COOM, $CF_3$—$CF_2$—$CF_2$—O—CF($CF_3$)—$CF_2$—O—CF($CF_3$)—$CF_2$—O—CF($CF_3$)—COOM, $CF_3$—$CF_2$—$CF_2$—O—CF($CF_3$)—$CF_2$—O—CF($CF_3$)—$CF_2$—O—CF($CF_3$)—$CF_2$—O—CF($CF_3$)—$CF_2$—O—CF($CF_3$)—COOM, in each of which M represents H, Li, Na, K, or $NR_4$, wherein R represents H or a linear alkyl group having 1 to 4 carbon atoms, are preferred. In respect of the influence on the global environment and industrial productivity, perfluoroether carboxylic acid derivatives such as $CF_3$—$CF_2$—$CF_2$—O—CF($CF_3$)—$CF_2$—O—CF($CF_3$)—COOM or $CF_3$—$CF_2$—$CF_2$—O—CF($CF_3$)—$CF_2$—O—CF($CF_3$)—$CF_2$—O—CF($CF_3$)—$CF_2$—O—CF($CF_3$)—$CF_2$—O—CF($CF_3$)—COOM, wherein M represents H, Li, Na, K, or $NR_4$, wherein R represents H or a linear alkyl group having 1 to 4 carbon atoms, are more preferred.

As the surfactant (c) in the present embodiment, those mentioned above may be used singly or in combinations of two or more. For example, $C_8F_{19}$—COOM, wherein M is the same as defined above, or the like may be used for emulsification in combination with the surfactant (c) in the present embodiment.

The content of the surfactant (c) in the present embodiment is preferably adjusted in association with the amount of the dispersion medium in the first aqueous dispersion. Specifically, the content is preferably 0.01 mass % to 5.0 mass %, more preferably 0.1 to 4.0 mass %, based on 100 mass % of the dispersion medium in the first aqueous dispersion. When the content of the surfactant is 0.01 mass % or more, there is a tendency that finely-divided dispersed oil droplets of the fluoroolefin (a) are stabilized and precipitation and coalescence of the oil droplets is more unlikely to occur. When the content of the surfactant is 5.0 mass % or less, there is a tendency that the liquid slightly foams when polymerization is conducted, this slight bubbling does not inhibit dissolution and diffusion of the fluoroolefin (b) into the aqueous layer, and generation of a heteropolymer decreases.

The content of the surfactant (c) is preferably set to a concentration around which micelle formation does not occur after the fluoroolefin (a) is finely-divided and dispersed. From such a viewpoint, the content of the surfactant (c) is preferably adjusted within the range described above.

The total amount of the surfactant (c) is preferably added to the fluoroolefin (a) before finely-divided and dispersed, but a portion of the surfactant (c) to be used may be added to the fluoroolefin (a) before finely-divided and dispersed, and the balance may be added thereto after desired finely-dividing and dispersion.

The amount of the dispersion medium included in the first aqueous dispersion can be about 50 mass % to 95 mass % and may be about 50 mass % to 90 mass %, based on 100 mass % of the first aqueous dispersion.

The content of $M_1OOCCF_2SO_3M_2$, wherein $M_1$ and $M_2$ each represent H, Li, Na, K or $NR_4$, where R represents H or a linear alkyl group having 1 to 4 carbon atoms, in the first aqueous dispersion is preferably 100 ppm or less, more preferably 20 ppm or less. $M_1OOCCF_2SO_3M_2$ can be considered to be a typical impurity in the first aqueous dispersion, and when the content thereof is 100 ppm or less, the later copolymerization reaction tends to be more easily controlled.

The content described above can be measured by a method described in examples mentioned below.

The content can fall within the above range by purifying the raw material fluoroolefin (a) by means of sufficient washing with water, distillation, or the like.

The total amount of $Fe^{2+}$ and $Fe^{3+}$ in the first aqueous dispersion is preferably 1 ppm or less, more preferably 0.1 ppm or less. $Fe^{2+}$ and $Fe^{3+}$ can be considered to be typical impurities in the first aqueous dispersion, and when the content thereof is 0.1 ppm or less, there is a tendency that decomposition of the polymerization initiator is unlikely to be facilitated and the later copolymerization reaction is more easily controlled.

The content described above can be measured by a method described in examples mentioned below.

Conducting an emulsification step mentioned below or the like under a condition of a pH of 2.0 to 7.0 enables the above content to fall within the above range.

The amount of dissolved oxygen in the first aqueous dispersion is preferably 1 ppm or less, more preferably 0.5 ppm or less. The dissolved oxygen can be considered to be a typical impurity in the first aqueous dispersion, and when the content thereof is 1 ppm or less, there is a tendency that a growing species having a radical is inactivated during the polymerization reaction, a chain transfer reaction scarcely occurs, and thus generation of a so-called oligomer having a small molecular weight is suppressed. This oligomer may be responsible for an uneven flow or bubbling on melt film formation, and thus the amount to be generated is preferably reduced.

The amount of the dissolved oxygen described above can be measured by a method described in examples mentioned below.

Conducting an emulsification step mentioned below or the like under an atmosphere having an oxygen concentration of 0.1% or less enables the above amount of dissolved oxygen to fall within the above range.

In the present embodiment, from the viewpoint mentioned above, it is notably preferred that the total amount of $Fe^{2+}$ and $Fe^{3+}$ in the first aqueous dispersion be 1 ppm or less and the amount of dissolved oxygen in the first aqueous dispersion be 1 ppm or less.

A value given by dividing the volume average particle size of the first aqueous dispersion by the number average particle size thereof is preferably 2.0 or less, more preferably 1.6 or less. When the above value is 2.0 or less, the fluoroolefin (a) is homogeneously transferred from oil droplets of the fluoroolefin (a) to the reaction site, and the copolymerization reaction can be easily controlled.

The volume average particle size and the number average particle size described above can be measured by a method described in examples mentioned below.

Appropriately stirring the entire system or the like in an emulsification step mentioned below enables the above values to fall within the above ranges.

(Second Aqueous Dispersion)

An aqueous dispersion according to a second aspect of the present embodiment (herein also referred to as "second aqueous dispersion") is an aqueous dispersion including a copolymer of a fluoroolefin (a) represented by the above general formula (1) and a fluoroolefin (b) represented by the following general formula (3), a surfactant (c) represented by the above general formula (2), and a dispersion medium comprising water, wherein the content of the surfactant (c) is 0.5% or more and 5.0% or less relative to the copolymer, and wherein the aqueous dispersion has a solid content concentration of more than 18 mass %:

$$CX_1X_2{=}CX_3X_4 \quad (3)$$

wherein $X_1$, $X_2$, $X_3$, and $X_4$ each represent H, F, or $CF_3$.

The second aqueous dispersion is not particularly limited as long as being configured as described above and is typically given preferably from the first aqueous dispersion. That is, use of the first aqueous dispersion as raw material enables polymerization of the fluoroolefin (a) and the fluoroolefin (b) in an aqueous system to proceed smoothly under mild conditions to thereby give the second aqueous dispersion including the copolymer. That is, the second aqueous dispersion includes the copolymer of the fluoroolefin (b) with the fluoroolefin (a) included in the first aqueous dispersion, and water.

The fluoroolefin (b) in the second aqueous dispersion is not particularly limited as long as the fluoroolefin (b) satisfies the above general formula (3), and is preferably tetrafluoroethylene and hexafluoropropylene, more preferably tetrafluoroethylene.

The solid content concentration of the second aqueous dispersion is more than 18 mass %, preferably 20 mass % or more, more preferably 22 mass % or more. The upper limit of the above solid content concentration is not particularly limited and is preferably 45 mass % or less. When the solid content concentration exceeds 18 mass %, the productivity is improved. When the solid content concentration is 45 mass % or less, there is a tendency that the dispersion state of the second aqueous dispersion is stabilized and the second aqueous dispersion is more unlikely to be aggregated.

As the surfactant (c) in the second aqueous dispersion, any known and used compound can be used as long as the compound satisfies the above general formula (2). From the viewpoint of the affinity to the copolymer in the second aqueous dispersion, preferred are perfluoro surfactants such as $CF_3$—O—$CF(CF_3)$—$CF_2$—O—$CF(CF_3)$—COOM, $CF_3$—$CF_2$—$CF_2$—O—$CF(CF_3)$—$CF_2$—O—$CF(CF_3)$—COOM, $CF_3$—$CF_2$—$CF_2$—O—$CF(CF_3)$—$CF_2$—O—$CF(CF_3)$—$CF_2$—O—$CF(CF_3)$—COOM, $CF_3$—$CF_2$—$CF_2$—O—$CF(CF_3)$—$CF_2$—O—$CF(CF_3)$—$CF_2$—O—$CF(CF_3)$—$CF_2$—O—$CF(CF_3)$—$CF_2$—O—$CF(CF_3)$—COOM, in each of which M represents H, Li, Na, K, or $NR_4$, wherein R represents H or a linear alkyl group having 1 to 4 carbon atoms. In respect of the influence on the global environment and industrial productivity, more preferred are perfluoroether carboxylic acid derivatives such as $CF_3$—$CF_2$—$CF_2$—O—$CF(CF_3)$—$CF_2$—O—$CF(CF_3)$—COOM or $CF_3$—$CF_2$—$CF_2$—O—$CF(CF_3)$—$CF_2$—O—$CF(CF_3)$—$CF_2$—O—$CF(CF_3)$—$CF_2$—O—$CF(CF_3)$—$CF_2$—O—$CF(CF_3)$—COOM, wherein M represents H, Li, Na, K, or $NR_4$, wherein R represents H or a linear alkyl group having 1 to 4 carbon atoms.

As the surfactant (c) in the second aqueous dispersion, those mentioned above may be used singly or in combinations of two or more. For example, $C_8F_{19}$—COOM, wherein M is the same as defined above, or the like may be used in combination with the surfactant (c) in the present embodiment.

The content of the surfactant (c) relative to the copolymer in the second aqueous dispersion is 0.5 mass % or more and 5.0 mass % or less, preferably 1.0 mass % or more and 5.0 mass % or less, more preferably 1.0 mass % or more and less than 4.0 mass %. When the above content is 0.5 mass % or more, the dispersion state of the second aqueous dispersion is stabilized, and the second aqueous dispersion is more unlikely to be aggregated. Furthermore, the portion derived from the fluoroolefin (a) in the copolymer is more unlikely to be hydrolyzed. When the content is 5.0 mass % or less, removal is facilitated on isolation of the copolymer.

The content described above can be measured based on a method described in examples mentioned below.

Conducting a polymerization step mentioned below or the like enables the above content to fall within the above range.

The cumulant diameter of the second aqueous dispersion is preferably 10 nm to 300 nm, more preferably 30 nm to 250 nm. The copolymer has a specific gravity greatly different from that of water and easily precipitates. Thus, the above cumulant diameter is 300 nm or less, precipitation of particles of the copolymer tends to be prevented. When the above cumulant diameter is 10 nm or more, there is a tendency that an excessive increase in the frequency of contact with water caused by an increase in the total surface area of the copolymer is prevented and thereby the portion derived from the fluoroolefin (a) in the copolymer can be prevented from being hydrolyzed.

The above cumulant diameter can be measured based on a method described in examples mentioned below.

For example, conducting a polymerization step mentioned below or the like enables the above cumulant diameter to fall within the above range.

The absolute value of the zeta potential of the second aqueous dispersion is preferably 25 mV or more, more preferably 30 mV or more, still more preferably 35 mV or more, even still more preferably 40 mV or more. When the absolute value is 25 mV or more, there is a tendency that the dispersion state of the second aqueous dispersion is stabilized and the second aqueous dispersion is more unlikely to be aggregated.

The absolute value of the zeta potential described above can be measured based on a method described in examples mentioned below.

Conducting a polymerization step mentioned below or the like enables the above absolute value of the zeta potential to fall within the above range.

The second aqueous dispersion has preferably a pH of 2.0 to 7.0, more preferably a pH of 2.0 to 6.9, still more preferably a pH of 2.2 to 6.7. When the pH is set to 7.0 or less, there is tendency that the portion derived from the fluoroolefin (a) in the copolymer can be prevented from being hydrolyzed. When the pH is 2.0 or more, there is a tendency that elution of metal ions such as iron ions from the reaction tank on further processing of the second aqueous dispersion, which elution affects the physical properties of the aqueous dispersion, can be prevented. For adjustment of the pH of the second aqueous dispersion, a pH adjusting agent may be used. The type and amount to be used thereof are the same as described above for the first aqueous dispersion.

In the present embodiment, from the viewpoint of the influence on the global environment, the GWP of the dispersion medium in the second aqueous dispersion is preferably less than 1,000. When a substance other than water is contained as a dispersion medium in the second aqueous dispersion, the GWP of each dispersion medium is preferably less than 1,000. The second aqueous dispersion preferably does not substantially include components having a GWP of 1,000 or more. The phrase "not substantially include" means that the content of the component(s) having a GWP of 1,000 or more in the second aqueous dispersion is less than 100 ppm.

Applications of the second aqueous dispersion are not particularly limited, and examples thereof include cation exchange membranes for salt electrolysis and membranes for fuel cells. The ion exchange capacity for an ion exchange membrane is preferably 0.83 meq./g or more and 2.08 meq./g or less. When the above ion exchange capacity is 0.83 meq./g or more, a thin film as a freestanding membrane tends to be given. When the above ion exchange capacity is 2.08 meq./g or less, there is a tendency that sufficient ion exchange performance is assured and the electrolytic voltage becomes lower (energy loss becomes smaller).

The ion exchange capacity described above can be measured based on a method described in examples mentioned below.

Producing an ion exchange membrane by a known method or the like using the second aqueous dispersion as raw material, for example, enables the above ion exchange capacity to fall within the above range.

[Method for Producing Aqueous Dispersion]

(Method for Producing First Aqueous Dispersion)

A method for producing the first aqueous dispersion is not particularly limited as long as the first aqueous dispersion configured as mentioned above is provided. From the viewpoint of giving the first aqueous dispersion more securely and efficiently, the method for producing the first aqueous dispersion preferably includes an emulsification step of shearing a mixed solution comprising water, the surfactant (c), and the fluoroolefin (a) at a peripheral velocity of 10 to 50 m/s, and the peripheral velocity is preferably 20 to 50 m/s.

(Emulsification Step)

In the emulsification step in the present embodiment, a mixed solution including water, the surfactant (c), and the fluoroolefin (a) is preferably sheared at a peripheral velocity of 10 to 50 m/s, and the peripheral velocity is more preferably 20 to 50 m/s. The above mixed solution can optionally include the pH adjusting agent mentioned above, from the viewpoint of adjusting the pH of the first aqueous dispersion to be given. As the above shearing means, known and used dispersing apparatuses and emulsifying apparatuses are widely used without particular limitation. For example, an emulsifying apparatus such as an ultrasonic grinder, a homogenizer, or a colloid mill mixer can be used. In order to suppress hydrolysis of the fluoroolefin (a), a homogenizer is preferably used. As the homogenizer, for example, Biomixer ABM-4 manufactured by Nihonseiki Kaisha Ltd. or the like can be used.

From the viewpoint of suppressing hydrolysis of the fluoroolefin (a), in the emulsification step, the solution temperature of the above mixed solution is set to preferably 20° C. or less, more preferably to 12° C. or less.

In the present embodiment, from the viewpoint of achieving a desired particle size, the peripheral velocity on shearing is set to preferably 10 m/s or more and 50 m/s or less, more preferably 20 m/s or more and 50 m/s or less, still more preferably 24 m/s or more and 50 m/s or less, even still more preferably 24 m/s or more and 48 m/s or less.

Further, from the viewpoint of preventing oxidative decomposition of the fluoroolefin (a) by dissolved oxygen and radical deactivation on polymerization, the oxygen concentration in the atmosphere in the emulsification step is preferably set to 1% or less, more preferably set to 0.1% or less.

In the present embodiment, from the viewpoint mentioned above, especially in the emulsification step, it is preferred that the oxygen concentration in the atmosphere be set to 0.1% or less and the solution temperature of the mixed solution be set to 20° C. or less.

(Method for Producing Second Aqueous Dispersion)

A method for producing the second aqueous dispersion is not particularly limited as long as the second aqueous dispersion configured as mentioned above is given. From the viewpoint of giving the second aqueous dispersion more securely and efficiently, the method for producing the second aqueous dispersion preferably includes a polymerization step of subjecting a polymerization initiator, the first aqueous dispersion, and a fluoroolefin (b) to polymerization to thereby give the second aqueous dispersion.

(Polymerization Step)

In the present embodiment, as described above, the first aqueous dispersion given by finely-dividing and dispersing the fluoroolefin (a) is used for polymerization. As the conditions and the like of the copolymerization reaction with the fluoroolefin (b), known and used common conditions and the like that are used for homopolymerization or copolymerization of fluorinated ethylene can be widely employed.

In the polymerization step, an emulsified solution including the polymerization initiator and the first aqueous dispersion has a pH of preferably 2.0 to 7.0, more preferably 2.0 to 6.9, still more preferably 2.2 to 3.9, even still more preferably 2.2 to 3.9. When the pH is 7.0 or less, there is a tendency that hydrolysis of the fluoroolefin (a) can be prevented. When the pH is 2.0 or less, there is a tendency that the stability of dispersed particles is lowered, precipitation and coalescence of the particles are unlikely to occur, metal ions such as iron ions are unlikely to be eluted from the reaction tank, decomposition of the polymerization initiator is suppressed, and thus, the copolymerization reaction can be easily controlled.

The polymerization temperature in the polymerization step, as the solution temperature of the above emulsified solution, is preferably 0 to 90° C., more preferably 20 to 60° C. When the polymerization temperature is 0° C. or more, the system under polymerization may be less likely to be solidified. When the polymerization temperature is 90° C. or less, the fluoroolefin (a) or the fluoroolefin (b) may be less likely to be hydrolyzed.

The polymerization pressure in the polymerization step is preferably 0.0 to 2.0 MPaG, more preferably 0.1 to 0.7 MPaG. When the polymerization pressure is 0.1 MPaG or more, the polymerization rate increases, and the reaction apparatus and the separation and collection equipment for copolymer can be reduced in size, which are advantageous in respect of work operations. When the polymerization pressure is set to 2.0 MPaG or less, homopolymerization of the fluoroolefin (b) in the gas phase portion is unlikely to occur, which is preferable in respect of both production and safety.

The polymerization initiator used in the present embodiment is not particularly limited, and examples thereof include, as water-soluble polymerization initiators, inorganic peroxides such as sodium persulfate, potassium persulfate, and ammonium persulfate, redox initiators such as ammonium persulfate-ferrous sulfate and ammonium persulfate-ammonium hydrogen sulfite, and hydroperoxides such as t-butyl hydroperoxide. Examples of polymerization initiators that can be also used, other than those described above, include, but are not limited to, azo compounds such as azobisisobutyronitrile, diacylperoxides such as benzoyl peroxide and pentafluoropropionyl peroxide, and peroxides such di-t-butyl peroxide. Of those described above, a water-soluble polymerization initiator is preferably used. When a water-soluble polymerization initiator is used, even if added after the fluoroolefin (a) is finely-divided and dispersed, there is a tendency that the initiator is easily homogeneously distributed and its operability is excellent.

The polymerization initiator preferably exhibits high activity under the polymerization temperatures mentioned above, and is used at a concentration, in terms of an amount of radical generated per hour, in the range of 0.001 to 5 mol %, preferably in the range of 0.01 to 1 mol %, particularly preferably in the range of 0.02 to 0.8 mol %, relative to the fluoroolefin (a). When the concentration of the initiator is 0.001 mol % or more, there is a tendency that the polymerization rate increases, and the reaction apparatus and the separation and collection equipment for copolymer can be reduced in size, which is advantageous in respect of work operations. When the concentration of the initiator is set to 5 mol % or less, there is a tendency that a sufficient strength can be imparted due to a decrease in the declining trend of the molecular weight and a polymer having a sufficiently high molecular weight can be given. In addition to consideration of the activity described above, from the viewpoint of inhibition of chain transfer reaction, which is a side reaction on polymerization, as the polymerization initiator, inorganic peroxides such as sodium persulfate, potassium persulfate, and ammonium persulfate, and redox initiators such as ammonium persulfate-ferrous sulfate and ammonium persulfate-ammonium hydrogen sulfite are especially preferred.

The present inventors have found that copolymers of widely ranging compositions can be given by copolymerizing the fluoroolefin (a) and the fluoroolefin (b) in a manner in which the fluoroolefin (a) and the fluoroolefin (b) are supplied continuously or intermittently to the reaction system in the polymerization step. This can be achieved by optionally varying the ratio between the fluoroolefin (a) and the fluoroolefin (b) supplied into the system. The composition also can be varied over time by varying the ratio in the course of the reaction. In the case of batch feed, because of limitations on the pressure, the amount of the fluoroolefin (b) that can be present in the system is trace, and the amount of the fluoroolefin (a) corresponding thereto is also trace. Thus, there is a tendency that batch feed is disadvantageous in respect of work operations such an increase in size of the reaction apparatus. With a method in which only the fluoroolefin (b) is supplied continuously or intermittently, only a copolymer having a high proportion of the fluoroolefin (a) is given. This tends to be disadvantageous from the viewpoint of giving copolymers of widely ranging compositions. For this reason, in the polymerization step, it is preferred that the fluoroolefin (b) be supplied continuously or intermittently or the fluoroolefin (b) and the first aqueous dispersion be supplied continuously or intermittently.

In the present embodiment, from the viewpoint mentioned above, especially in the polymerization step, it is preferred that the pH of the emulsified solution be 2.0 to 7.0, the polymerization temperature be 0 to 90° C., and the polymerization pressure be 0.0 to 2.0 MPaG. It is more preferred that the pH of the emulsified solution be 2.0 to 7.0, the polymerization temperature be 30 to 90° C., and the polymerization pressure be 0.5 to 2.0 MPaG in the polymerization step. Under these conditions, further, it is preferred that the fluoroolefin (b) be supplied continuously or intermittently or the fluoroolefin (b) and the first aqueous dispersion be supplied continuously or intermittently.

Second Embodiment

A second aspect according to the present embodiment (also referred to as "second embodiment" herein) now will be described in detail.

In the second embodiment, the term "low-molecular compound" means a so-called oligomer, in which the number of monomer units constituting the polymer is relatively small (the degree of polymerization is relatively small). The low-molecular compound is a component that affects the characteristics of the fluorine copolymer composition of the present embodiment, and the molecular weight (degree of polymerization) depends on applications (required characteristics).

[Fluorine Copolymer Composition]

The fluorine copolymer composition of the present embodiment (hereinbelow, unless otherwise indicated, "the present embodiment" in the section of <<Second Embodiment>> means the second embodiment.) includes:

a fluorine copolymer (A) having a unit (a) derived from a perfluorovinyl compound having a sulfonyl group and a unit (b) derived from a fluoroolefin; and a low-molecular compound (B) having a functional group represented by —COOX, wherein X is $CH_3$ or $CH_2CH_3$.

The content of the low-molecular compound (B) is 700 ppm or less based on the mass of the fluorine copolymer composition.

The fluorine copolymer composition of the present embodiment is configured as described above, and thus, bubbling on film formation and delamination on preparation of a laminated membrane can be suppressed. The fluorine copolymer composition of the present embodiment is configured as described above, and thus, coloration on film formation is expected to be suppressed.

(Fluorine Copolymer (A))

The fluorine polymer composition of the present embodiment includes the fluorine copolymer (A) as its main component. The fluorine copolymer (A) has a unit (a) derived from a perfluorovinyl compound having a sulfonyl group and a unit (b) derived from a fluoroolefin.

<Unit (a)>

The fluorine copolymer (A) has a unit (a), and the unit (a) is derived from a perfluorovinyl compound having a sulfonyl group.

The perfluorovinyl compound having a sulfonyl group (hereinbelow, also referred to as "compound (m1)") is not particularly limited as long as the perfluorovinyl compound is a vinyl monomer having one or more fluorine atom in its molecule and having a sulfonic acid-type functional group (hereinbelow, may be described as "perfluorovinyl compound having a sulfonic acid-type functional group"), and conventionally known ones may be used.

The sulfonic acid-type functional group here is a sulfonic acid group (—$SO_3H$) itself or a functional group that may be converted into a sulfonic acid group by hydrolysis or neutralization.

Examples of the functional group that may be converted into a sulfonic acid group include —$SO_3M$ (provided that M is an alkali metal or quaternary ammonium salt), —$SO_2F$, —$SO_2Cl$, and —$SO_2Br$.

As the compound (m1), from the viewpoints of being excellent in production costs of the monomer, reactivity with other monomers, and characteristics of the fluorine copolymer (A) to be given, the following compound (m2) or compound (m3) is preferred.

$CF_2$═CF—O—$R^{f2}$-$A^2$ compound (m2)

$CF_2$═CF—$R^{f2}$-$A^2$ compound (m3)

$R^{f2}$ is a perfluoroalkylene group having 1 to 20 carbon atoms, may include an ethereal oxygen atom, and may be either linear or branched.

$A^2$ is a sulfonic acid-type functional group.

Specifically preferable examples of the compound (m2) include the following compounds.

$CF_2$═CF—O—$(CF_2)_{1-8}$—$SO_2F$ $CF_2$═CF—O—$CF_2CF(CF_3)O(CF_2)_{1-8}$—$SO_2F$ $CF_2$═$CF[OCF_2CF(CF_3)]_{1-5}SO_2F$

Specifically preferable examples of the compound (m3) include the following compounds.

$CF_2$═$CF(CF_2)_{0-8}$—$SO_2F$ $CF_2$═CF—$CF_2$—O—$(CF_2)_{1-8}$—$SO_2F$

More preferable examples of the perfluorovinyl compound having a sulfonic acid-type functional group include the following compounds, from the viewpoint of easy industrial synthesis.

$CF_2$═$CFOCF_2CF_2SO_2F$ $CF_2$═$CFOCF_2CF_2CF_2SO_2F$ $CF_2$═$CFOCF_2CF_2CF_2CF_2SO_2F$ $CF_2$═$CFOCF_2CF(CF_3)OCF_2CF_2SO_2F$ $CF_2$═$CFOCF_2CF(CF_3)OCF_2CF_2CF_2SO_2F$ $CF_2$═$CFOCF_2CF(CF_3)SO_2F$ $CF_2$═$CFCF_2CF_2SO_2F$ $CF_2$═$CFCF_2CF_2CF_2SO_2F$ $CF_2$═$CFCF_2CF_2CF_2CF_2SO_2F$ $CF_2$═CF—$CF_2$—O—$CF_2CF_2$—$SO_2F$

The perfluorovinyl compound having a sulfonic acid-type functional group is preferably a perfluorovinylether represented by the following formula (I). Further, in the following formula (I), it is more preferred that M is F:

$$CF_2{=}CF{-}(OCF_2CYF)_a{-}O{-}(CF_2)_b{-}SO_2M \quad (I)$$

wherein a represents an integer of 0 to 2, b represents an integer of 1 to 4, Y represents —F or —$CF_3$, and M represents —F or —Cl.

As the perfluorovinyl compound having a sulfonic acid-type functional group that forms the unit (a), those mentioned above may be used singly or in combinations of two or more.

<Unit (b)>

The fluorine copolymer (A) has a unit (b), and the unit (b) is derived from a fluoroolefin.

As the fluoroolefin, there is used an olefin having one or more fluorine atoms in its molecule and having 2 to 3 carbon atoms.

Examples of the fluoroolefin include tetrafluoroethylene ($CF_2$═$CF_2$; hereinbelow, also referred to as "TFE"), chlorotrifluoroethylene ($CF_2$═CFCl), vinylidene fluoride ($CF_2$═$CH_2$), vinyl fluoride ($CH_2$═CHF), and hexafluoropropylene ($CF_2$═$CFCF_3$).

From the viewpoint of being excellent in production costs of the monomer, reactivity with other monomers, and characteristics of the fluorine copolymer (A) to be given, TFE is particularly preferred. Such fluoroolefins may be used singly or in combinations of two or more.

<Additional Monomer>

As a monomer for forming the fluorine copolymer (A), further an additional monomer may be employed in addition to the perfluorovinyl compound having a sulfonyl group and the fluoroolefin.

The additional monomer does not correspond to the perfluorovinyl compound having a sulfonyl group and the fluoroolefin, and examples thereof include $CF_2$═CF—$R^f$ (provided that $R^f$ is a perfluoroalkyl group having 1 to 10 carbon atoms and including an ethereal oxygen atom in the middle thereof), $CF_2$═CF—$OR^{f1}$ (provided that $R^{f1}$ is a perfluoroalkyl group having 1 to 10 carbon atoms and may include an ethereal oxygen atom), and $CF_2$═$CFO(CF_2)_v$ $OCF$═$CF_2$ (provided that v is an integer of 1 to 3).

In the fluorine copolymer (A), copolymerizing the additional monomer can improve the flexibility and mechanical strength of an ion exchange membrane in which the fluorine copolymer composition of the present embodiment is employed. The proportion of the additional monomer is preferably 30 mass % or less, more preferably 1 to 20 mass %, relative to the total monomers (100 mass %), from the viewpoint of maintenance of the ion exchange performance.

(Low-Molecular Compound (B))

The fluorine copolymer composition of the present embodiment includes a low-molecular compound (B) having a functional group represented by —COOX, wherein X is $CH_3$ or $CH_2CH_3$.

The low-molecular compound (B) refers to a compound having the specific functional group and having a molecular weight of 5000 or less. The molecular weight is 300 or less because of the generation mechanism (molecular structure).

The content of the low-molecular compound (B) is 700 ppm or less based on the mass of the fluorine copolymer composition, from the viewpoint of prevention of delamination (a phenomenon called a so-called "delami") on preparation of a laminated membrane in which the fluorine copolymer composition of the present embodiment is employed. From the similar viewpoint, the content is preferably 500 ppm or less, more preferably 350 ppm or less, still more preferably 300 ppm or less.

The lower limit of the content is not particularly limited and about 1 ppm, for example.

In the fluorine copolymer composition of the present embodiment, the content of the low-molecular compound (B) is preferably 10 ppm or more, from the viewpoint of improvement in adhesion on preparation of the laminated membrane. The content the low-molecular compound (B) can be measured by a method described in examples mentioned below. The above content can be controlled within the range mentioned above by employing a preferred production method mentioned below or the like.

The low-molecular compound (B) has a —COOX group, wherein X is $CH_3$ or $CH_2CH_3$, at least one terminal of the main chain. Examples of the low-molecular compound (B) include compounds having a structure represented by the following formula (1), (2), or (3). In the following formula (1), the main chain structure consists only of TFE units, and in the following formulas (2) and (3), the main chain structure is an oligomer of copolymer of sulfonic acid-type monomer units and TFE units.

$$XOOC{-}CF_2{-}(CF_2CF_2)_n{-}CF_2CF_2{-}SO_2F \quad (1)$$

(2)

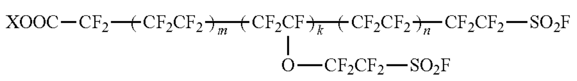

(3)

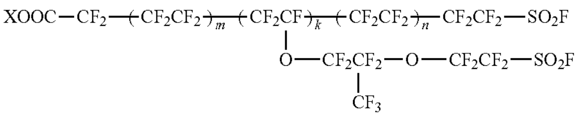

When the fluorine copolymer (A) is a copolymer of $CF_2{=}CFOCF_2CF_2SO_2F$ and TFE or a copolymer of $CF_2{=}CFOCF_2CF(CF_3)OCF_2CF_2SO_2F$ and TFE, the three types of oligomers described above may be generated (in the formulas (1), (2), and (3), m and n each are an integer≥0, k is an integer≥1) as the low-molecular compound (B). Each $—SO_2F$ group may be partially hydrolyzed, and in the later steps that follow, may become $—SO_3M$, wherein M is H, $NH_4$, a monovalent metal ion, $CH_3$, or $CH_2CH_3$.

The low-molecular compound (B) used in the fluorine copolymer composition of the present embodiment has a stable structure in which the terminal —COOX (carboxyl group) is esterified, and thus has an effect of suppressing bubbling due to decarboxylation decomposition on heating of the main chain terminal during melt molding and bubbling due to absorption of moisture in air.

(Low-Molecular Compound (C))

The fluorine copolymer composition of the present embodiment further includes a low-molecular compound (C) having a functional group represented by —COOX, wherein X is H, $NH_4$, or a monovalent metal ion.

The low-molecular compound (C) refers to a compound having the specific functional group and having a molecular weight of 5000 or less. The molecular weight is 300 or more because of the generation mechanism (molecular structure).

In the fluorine polymer composition of the present embodiment, the content of the low-molecular compound (C) is preferably 250 ppm or less, more preferably 100 ppm or less, still more preferably 50 ppm or less, from the viewpoint of suppressing bubbling on membrane formation.

The lower limit of the content of the low-molecular compound (C) is not particularly limited and may be about 1 ppm, for example. In fluorine polymer composition of the present embodiment, the content of the low-molecular compound (C) is preferably 5 ppm or more, from the viewpoint of improvement in adhesion on preparation of the laminated membrane. The content the low-molecular compound (C) can be measured by a method described in examples mentioned below. The above content can be controlled within the range mentioned above by employing a preferred production method mentioned below or the like.

The low-molecular compound (C) has a —COOX group, wherein X is H, $NH_4$, or a monovalent metal ion, at least one terminal of the main chain. Examples of the low-molecular compound include compounds having a structure represented by the following formula (4), (5), or (6).

In the following formula (4), the main chain structure consists only of TFE units, and in the following formulas (5) and (6), the main chain structure is an oligomer of a copolymer of sulfonic acid-type monomer units and TFE units.

$$XOOC{-}CF_2{-}(CF_2CF_2)_n{-}CF_2CF_2{-}SO_2F \quad (4)$$

(5)

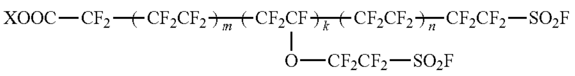

(6)

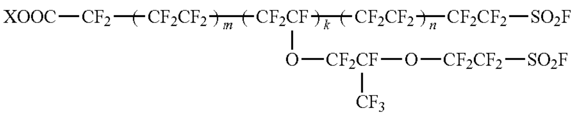

When the fluorine copolymer (A) is a copolymer of $CF_2{=}CFOCF_2CF_2SO_2F$ and TFE or a copolymer of $CF_2{=}CFOCF_2CF(CF_3)OCF_2CF_2SO_2F$ and TFE, the three types of oligomers described above may be generated (in the formulas (4), (5), and (6), m and n each are an integer≥0, k is an integer≥1) as the low-molecular compound (C). Each $—SO_2F$ group may be partially hydrolyzed and may become $—SO_3M$, wherein M is H, $NH_4$, or a monovalent metal ion.

The low-molecular compound (C) has a structure likely to adsorb water due to its ionic group, and thus is likely to be decarboxylated. This affects bubbling on melt molding.

[Method for Producing Fluorine Copolymer Composition]

The method for producing the fluorine copolymer composition of the present embodiment (hereinbelow, also referred to as "the production method of the present embodiment") has a step of polymerizing a fluoroolefin and a perfluorovinyl compound having a sulfonyl group to give a fluorine copolymer (A).

Examples of the polymerization method include a bulk polymerization method, a solution polymerization method, an emulsion polymerization method, and a suspension polymerization method. From the viewpoint that the polymerization tank has a high volume efficiency, heat during polymerization is easily removed, the torque on stirring is low, and fluorine copolymer having wide ion exchange capacities can be produced, emulsion polymerization is preferred. When solution polymerization is employed, the content of the low-molecular compounds (B) and (C) in the fluorine copolymer composition tends to increase.

Examples of the polymerization medium in the solution polymerization method include hydrochlorofluorocarbons, hydrofluorocarbons, hydrofluoroethers, hydrocarbons, chlorocarbons, and alcohols.

Examples of the polymerization medium in the suspension polymerization method include water and methanol.

Examples of the polymerization medium in the emulsion polymerization method include water, and a polymerization medium similar to that used in the solution polymerization method may be used in combination.

The polymerization pressure is preferably 0.05 MPaG (gauge pressure) or more. When the polymerization pressure is 0.05 MPaG or more, the rate of the polymerization reaction can be maintained at a practically satisfactory rate, and a fluorine copolymer (A) having a high molecular weight can be given.

The polymerization pressure is preferably 2.0 MPaG or less, and in respect of safety, more preferably 0.7 MPaG or less.

Polymerization conditions other than the polymerization pressure and operation methods are not particularly limited, and known conditions and operation methods can be widely employed. An optimal value of the polymerization temperature may be selected in accordance with the type, reaction molar ratio, and the like of the monomers. Reaction at an excessive high temperature or low temperature is disadvantageous for industrial implementation, and thus, the polymerization temperature is preferably 20 to 90° C., more preferably 30 to 80° C.

The polymerization reaction may be started by irradiation with ionizing radiation, but use of a polymerization initiator such as an azo compound or a peroxy compound exhibiting high activity at the suitable reaction temperature mentioned above (20 to 90° C.) is advantageous for industrial implementation.

Examples of the polymerization initiator include, but are not limited to, diacyl peroxides such as disuccinic acid peroxide, benzoyl peroxide, perfluoro-benzoyl peroxide, lauroyl peroxide, and bis(pentafluoropropionyl)peroxide; azo compounds such as 2,2'-azobis(2-amidinopropane)hydrochloride, 4,4'-azobis(4-cyanovaleric acid), dimethyl 2,2'-azobisisobutyrate, and azobisisobutyronitrile; peroxyesters such as t-butyl peroxyisobutyrate and t-butyl peroxypivalate; peroxydicarbonates such as diisopropyl peroxydicarbonate and bis(2-ethylhexyl)peroxydicarbonate; hydroperoxides such as diisopropylbenzene hydroperoxide and t-butyl hydroperoxide), dialkyl peroxides such as di-t-butyl peroxide and perfluoro-di-t-butyl peroxide; ammonium persulfate, sodium persulfate, and potassium persulfate.

The amount of the polymerization initiator to be added is preferably 0.0001 to 3 parts by mass, more preferably 0.0001 to 2 parts by mass, based on 100 parts per mass of the monomers used. Lowering the amount of the polymerization initiator to be added enables the molecular weight of the fluorine copolymer (A) to increase. In the polymerization reaction, a molecular weight regulator (chain transfer agent) and the like used in usual solution polymerization may be added, in addition to the polymerization initiator.

The monomers to be used in the polymerization reaction may be fed in a batch mode or may be fed sequentially or continuously.

From the viewpoint that the concentration of the monomers in the polymerization reaction system is kept constant to homogenize the composition of the fluorine copolymer (A) to be generated, for example, a fluoroolefin and a perfluorovinyl compound having a carboxylic acid-type functional group are preferably added sequentially into the polymerization system including water and the like as the polymerization medium to allow the monomers to react continuously.

In the case of sequential addition of the monomers, the monomers may be added while proportion of each of the monomers added in the initial stage of the polymerization may be varied in the later stage of the polymerization or may be added such that the concentration of each of the monomers in the polymerization system is kept constant by compensating each of the monomers consumed by the polymerization. From the viewpoint of homogenization of the composition of the fluorine copolymer (A) to be given, the latter is preferable. Specifically, it is preferred that the fluoroolefin be sequentially introduced so as to keep the polymerization pressure constant and that the perfluorovinyl compound having a sulfonyl group be sequentially added in proportion to the amount of the fluoroolefin introduced.

Examples of a method for depositing the fluorine copolymer (A) from the polymerization solution provided in the above polymerization reaction include a method of adding a coagulant, a method of freezing an aqueous dispersion of the fluorine copolymer (A), and a method of demulsifying the fluorine copolymer (A) with a device, apparatus, or the like equipped with a shearing blade to deposit the fluorine copolymer (A). From the viewpoint of productivity, addition of a coagulant is preferred.

As the coagulant, an aqueous solution of an inorganic acid or a salt thereof or an organic acid or a salt thereof having coagulation and solidification ability can be employed. The coagulant is preferably an aqueous solution including one or more substances selected from monovalent inorganic acids, salts of monovalent inorganic acids, divalent inorganic acids, salts of divalent inorganic acids, trivalent inorganic acids, salts of trivalent inorganic acids, and the like. Examples of the monovalent inorganic acid include, but are not limited to, hydrochloric acid and nitric acid. Examples of the divalent inorganic acid include, but are not limited to, sulfuric acid. Examples of the trivalent inorganic acid include, but are not limited to, phosphoric acid. Examples of cationic elements or molecules that may form a salt with these acids include, but are not limited to, alkali metals, alkaline earth metals, transition metals (iron, zinc), the group 13 metals such as aluminum, and ammonium.

A solution of the organic acids or salts of the organic acids described above is preferably an aqueous solution including one or more substances selected from monovalent organic acids, salts of monovalent organic acids, divalent organic acids, salts of divalent organic acids, and the like. Examples of the monovalent organic acids include, but are not limited to, formic acid and acetic acid, and examples of the divalent organic acids include, but are not limited to, oxalic acid, malic acid, maleic acid, malonic acid, and tartaric acid. Examples of salts of the divalent organic acids include, but are not limited to, salts of tartaric acid, oxalic acid, or the like with an alkali metal, an alkaline earth metal, a transition metal (iron, zinc), the group 13 metal such as aluminum, ammonium, or the like.

Specific examples of the solutions of the inorganic acids, solutions of salts of the inorganic acids, solutions of the organic acids, and solutions of salts of the organic acid described above can include, but are not limited to, solutions including one or combinations of two or more of: aqueous solutions of inorganic salts including: chlorides such as ammonium chloride, potassium chloride, sodium chloride, calcium chloride, barium chloride, magnesium chloride, lithium chloride, and aluminum chloride, sulfates such as ammonium sulfate, potassium sulfate, sodium sulfate, magnesium sulfate, lithium sulfate, and aluminum sulfate, carbonates such as potassium carbonate and sodium carbonate; aqueous solutions of inorganic acids such as hydrochloric acid, sulfuric acid, nitric acid, and phosphoric acid; organic acids such as acetic acid and formic acid and aqueous solutions thereof; aqueous solutions of salts of organic acids such as sodium acetate, calcium acetate, sodium formate, and calcium formate. Of these, aqueous solutions of ammonium carbonate, potassium carbonate, sodium carbonate, ammonium sulfate, potassium sulfate, sodium sulfate, and magnesium sulfate are particularly preferred.

As a method for adding the coagulant solution, batch addition, addition in portions, or continuous addition may be used. From the viewpoint of the filterability on removal by washing of the coagulant from the fluorine copolymer (A) after coagulation, the temperature of the aqueous dispersion of the fluorine copolymer (A) on addition of the coagulant is preferably 1° C. or more and 35° C. or less, more preferably 1° C. or more and 15° C. or less, still more preferably 1° C. or more and 10° C. or less, particularly preferably 1° C. or more and 5° C. or less.

Further, in order to adjust the viscosity of the fluorine copolymer (A) to be coagulated, on addition of the coagulant, the aqueous dispersion of the fluorine copolymer (A) may be diluted with distilled water in advance. The amount of the diluting water is preferably 1 time to 15 times by mass, more preferably 3 to 10 times by mass, relative to the fluorine copolymer (A), and from the viewpoint of the handleability on collection of the fluorine copolymer (A) after coagulation, 4 to 8 times by mass are more preferred.

In order to improve the filterability of the fluorine copolymer (A) after addition of the coagulant, a warming step may be provided. The warming temperature is preferably 35° C. or more and 90° C. or less, more preferably 40° C. or more and 80° C. or less, still more preferably 45° C. or more and 75° C. or less, particularly preferably 50° C. or more and 70° C. or less. Addition of the operation promotes fusion and dehydration of aggregates and improves the filterability.

As a method for depositing the fluorine copolymer (A) using the coagulant, the aqueous dispersion of the fluorine copolymer (A) may be added to the coagulant solution. As the addition method, batch addition, addition in portions, or continuous addition may be used. Also in this case, the temperature of the aqueous dispersion of the fluorine copolymer (A) is preferably 1° C. or more and 35° C. or less, more preferably 1° C. or more and 15° C. or less, still more preferably 1° C. or more and 10° C. or less, particularly preferably 1° C. or more and 5° C. or less.

The water content of a coagulation cake of the fluorine copolymer (A), which is given by filtering off the fluorine copolymer (A) given by coagulation, is preferably 10 to 90% or less, more preferably 30 to 80%, still more preferably 40 to 75%, particularly preferably 50 to 70%, from the viewpoint of washability and filterability of the coagulant on the subsequent washing and filtering operation. For example, a squeezing operation or the like may be added to adjust the water content.

The coagulation cake of the fluorine copolymer (A) described above may be washed with distilled water to remove the coagulant and then further washed with alcohol. This can replace the moisture contained in the fluorine copolymer (A) with a solvent, which is advantageous for contact reaction in the next step.

The amount of distilled water or alcohol used for washing is preferably 1 to 20 times by mass, more preferably 2 to 10 times by mass, still more preferably 2.5 to 5 times by mass, relative to the fluorine copolymer composition. The washing time is preferably 5 minutes to 1 hour, more preferably 10 minutes to 45 minutes, still more preferably 15 minutes to 30 minutes. The number of times of washing is preferably 1 or more and preferably 10 or less.

Examples of alcohols for use in washing include, but are not limited to, primary alcohols such as methanol, ethanol, 1-propanol, n-butanol, isobutanol, n-hexanol, allyl alcohol, and benzyl alcohol; secondary alcohols such as isopropanol, sec-butyl alcohol, cyclopentanol, cyclohexanol, and menthol; tertiary alcohols such as t-butyl alcohol; diols such as ethylene glycol, propylene glycol, 1,3-propanediol, 1,2-butanediol, 1,4-butanediol, 1,5-pentanediol, 1,6-hexanediol, and cyclohexanedimethanol; triols such as glycerin, trimethylolethane, trimethylolpropane, trimethylolbutane, and 2-hydroxymethyl-1,4-butanediol; and tetraols such as pentaerythritol, and methanol is particularly preferred. Those described above may be used singly or in admixtures of two or more. Alternatively, the composition may be sequentially varied.

The method for producing the fluorine copolymer composition of the present embodiment preferably has a step of bringing the fluorine copolymer composition in a solvent- or water-containing state into contact with an ortho ester or an alcohol.

The fluorine copolymer composition in the step of bringing the composition into contact with an ortho ester or an alcohol may be in the form of a powder or pellets.

The solvent content or water content of the fluorine copolymer composition is 5 to 50 mass %, more preferably 5 to 30 mass %, still more preferably 5 to 20 mass %, even still more preferably 5 to 15 mass %, relative to the fluorine copolymer composition.

With the composition in such a form, the affinity of the fluorine copolymer (A) and the low-molecular compound to the ortho ester or the alcohol increases, the fluorine copolymer (A) and the unstable main chain terminal —COOX (carboxyl groups) of the low-molecular compound are easily esterified to give a stable structure, and bubbling due to decarboxylation decomposition on heating of the main chain terminal during melt molding and bubbling due to absorption of moisture in air can be suppressed.

Further, the low-molecular compound (B) and the low-molecular compound (C) are easily eluted into the contact solvent during the contact step, and the low-molecular compounds (B) and (C) can be removed in the filtration and washing step after the contact step.

Conducting the above operation lowers the content of the low-molecular compounds (B) and (C) themselves in the fluorine copolymer composition, and thus delamination at the interface between membranes laminated also can be suppressed.

The solvent content or water content of the fluorine copolymer composition can be determined by use of the change in the mass after heating at 200° C. to dryness. Subjecting the fluorine copolymer composition to a $N_2$ gas flow, heating, or reduced pressure, or leaving the fluorine copolymer composition to stand in air can control the content within the above numerical range.

When the fluorine copolymer composition is in a solvent-containing state, the type of solvent is not limited. From the viewpoint of productivity (reduction in the number of steps), the solvent is preferably derived from the steps before contact. The solvent may be, for example, a washing solvent or washing water for use in removal of residues of the fluorine copolymer (A) such as a flocculant, an emulsifier, or the like. The fluorine copolymer composition once dried by heating or the like has high hydrophobicity and a poor solvent affinity. Thus, it is difficult to bring the fluorine copolymer composition once dried into a solvent- or water-containing state again.

The temperature at which the fluorine copolymer composition is in contact with an ortho ester or an alcohol is preferably from room temperature to the boiling point of the solvent to be in contact, more preferably from 50 to 100° C. With the temperature of 50° C. or more, the fluorine copolymer (A) and the unstable main chain terminals —COOX (carboxyl groups) of the low-molecular compounds (B) and (C) are easily esterified, and the low-molecular compounds (B) and (C) are easily eluted in the reaction solvent.

The contact time is preferably 15 minutes to 16 hours, more preferably 30 minutes to 10 hours, still more preferably 1 hour to 8 hours. A higher contact temperature makes the contact time shorter.

The amount of the ortho ester or the alcohol to be in contact with the fluorine copolymer composition is preferably 1 to 20 times by mass, more preferably 2 to 10 times by mass, still more preferably, 2.5 to 5 times by mass, relative to fluorine copolymer composition.

When the amount of the ortho ester or the alcohol is small, the low-molecular compounds (B) and (C) cannot be sufficiently removed. When the amount of the ortho ester or the alcohol is large, treatment after the contact takes times, large equipment is required as equipment for contact, and the productivity is lowered.

Examples of the ortho ester to be in contact with the fluorine copolymer composition include, but are not limited to, orthoformates, orthoacetates, orthopropionates, and orthobutyrates. Of these, orthoformates and orthoacetates are preferred.

Examples of orthoformates include, but are not limited to, trimethyl orthoformate, triethyl orthoformate, and tripropyl orthoformate.

Examples of orthoacetates include, but are not limited to, trimethyl orthoacetate and triethyl orthoacetate.

Examples of orthopropionates include, but are not limited to, trimethyl orthopropionate.

Examples of orthobutyrates include, but are not limited to, trimethyl orthobutyrate and triethyl orthobutyrate.

Additionally, orthoacetate salts and orthopropionate salts are also included, and for example, trimethyl orthoacetate and triethyl orthoacetate also may be used.

Particularly preferred ortho esters of these are trimethyl orthoformate and triethyl orthoformate.

Examples of alcohols to be in contact with the fluorine copolymer composition include, but are not limited to, primary alcohols such as methanol, ethanol, 1-propanol, n-butanol, isobutanol, n-hexanol, allyl alcohol, and benzyl alcohol; secondary alcohols such as isopropanol, sec-butyl alcohol, cyclopentanol, cyclohexanol, and menthol; tertiary alcohols such as t-butyl alcohol; diols such as ethylene glycol, propylene glycol, 1,3-propanediol, 1,2-butanediol, 1,4-butanediol, 1,5-pentanediol, 1,6-hexanediol, and cyclohexanedimethanol; triols such as glycerin, trimethylolethane, trimethylolpropane, trimethylolbutane, and 2-hydroxymethyl-1,4-butanediol; and tetraols such as pentaerythritol. Of these, primary alcohols are preferred, and methanol is particularly preferred.

As the solvent to be in contact with the fluorine copolymer composition, ortho esters are more preferred from the viewpoint of foamability.

In the method for producing the fluorine copolymer composition of the present embodiment, an acid can be additionally present in the reaction system in order to facilitate the reaction.

Examples of the acid that can be used include Bronsted acids and Lewis acids, and solid acids such as acid-type ion exchange resins, acid clay, and heteropoly acids. For example, sulfuric acid, hydrochloric acid, p-toluenesulfonic acid, and the like can be suitably used.

As for ortho esters and alcohols as the contact solvent, an ortho ester and an alcohol may be used in combination. When moisture is present in the reaction system, esterification reaction is slow or becomes an equilibrium reaction, and the esterification reaction may not progress. The ortho ester acts as an esterifying agent, additionally has action of reacting with moisture in the system to consume water, and thus serves also as a dehydrating agent. This action is advantageous for esterification of the fluorine copolymer (A) and unstable functional groups (COOH) included in the low-molecular compound to progress.

After the fluorine copolymer composition is brought into contact with the ortho ester or the alcohol, washing with an organic solvent is preferably conducted. With washing in this manner, there is a tendency that the low-molecular compound eluted in the ortho ester and alcohol can be removed and bubbling, delamination, coloration, and the like during heating and melting can be suppressed.

Examples of organic solvents that can be used for washing include, but are not limited to, polar solvents having an affinity with water, such as methanol, ethanol, 1-propanol, isopropanol, n-butanol, 2-butanol, t-butanol, acetone, acetonitrile, tetrahydrofuran, and dioxane. Of these, methanol is preferred. Examples of substances that cause bubbling on thermal film formation include, other than the low-molecular compounds mentioned above, low-molecular polar compounds such as hydrolyzed monomers and emulsifiers. These substances also can be removed by the washing step.

The amount of the organic solvent for washing is preferably 1 to 100 times by mass, more preferably 3 to 50 times by mass, relative to the fluorine copolymer composition. With the amount within the range, the amount of the organic solvent for washing can be sufficiently provided, and sufficient washing can be conducted. Additionally, the amount of the organic solvent for washing is not excessively large, the treatment after the washing can be conducted in a short period, large washing equipment is not required as equipment for washing, and practically sufficient productivity can be achieved.

The number of times of washing is associated with the amount of the organic solvent for washing. When the amount of the organic solvent for washing is large, the number of times of washing may be small, and when the amount of the organic solvent for washing is small, the number of times of washing becomes larger. The number of times of washing is preferably 1 or more and preferably 5 or less.

The washing temperature is preferably from room temperature to 150° C. When the washing temperature is excessively low, the amount of low-molecular compounds (B) and (C) washed is small, and when the temperature exceeds 150° C., the decomposition of the fluorine-containing copolymer is started.

The washing time is preferably 5 minutes to 12 hours, more preferably 20 minutes to 6 hours. When the washing temperature is high, the washing time becomes shorter.

Separation treatment after the washing may be conducted still at the heating temperature during the above washing or may be conducted after cooling.

Filtration may be conducted directly after the washing or may be conducted after a poor solvent is added and the composition is deposited. Alternatively, methods other than filtration, such as centrifugation, may be employed.

The total amount of the low-molecular compound (B) and the low-molecular compound (C) to be removed by washing is preferably 10 mass % or less based on 100 mass % of the fluorine copolymer composition before the washing. When the amount of the low-molecular components (B) and (C) to be removed exceeds 10 mass %, there is a tendency that the yield of the expensive fluorine copolymer composition decreases to thereby lead to an economic disadvantage.

An approach for drying the fluorine copolymer composition provided by the above operation is not particularly limited. The drying can be conducted by appropriately combining heating and pressure reduction, for example. Combining the above heating with pressure reduction is preferred from the viewpoint that the heating temperature can be lowered and coloration of the fluorine copolymer composition can be suppressed. The heating temperature is preferably from room temperature to 150° C. or less, more preferably 50° C. or more and 140° C. or less, still more preferably 80° C. or more and 130° C. or less, particularly preferably 90° C. or more and 120° C. or less. The heating time is preferably 10 minutes or more and 20 hours or less, more preferably 30 minutes or more and 10 hours or less, still more preferably 1 hour or more and 5 hours or less. Coarse drying may be conducted with a $N_2$ gas flow or the like before the drying. The coarse drying and the drying can be conducted both in a standing state and a stirred state, and from the viewpoint of drying efficiency and homogeneous drying, drying under stirring is preferred.

In the case where an infrared transmission spectrum for the fluorine copolymer composition was separated into peaks each having a maximum around 1790 $cm^{-1}$ (derived from the ester group), a maximum at 1770 $cm^{-1}$, and a maximum around 1810 $cm^{-1}$ (derived from the carboxyl group), and the peak areas given were each denoted as A, B, and C, and 100×A/(A+B+C) was defined as the esterification rate (%), the degree of progress of esterification of the fluorine copolymer composition given is preferably 50% or more, more preferably 70% or more, still more preferably 80% or more, from the viewpoint of the moisture absorption resistance.

[Ion Exchange Membrane]

The ion exchange membrane of the present embodiment includes the fluorine copolymer composition of the present embodiment.

The ion exchange membrane of the present embodiment can be produced using the fluorine polymer composition of the present embodiment. A method for producing the ion exchange membrane has a step of forming a membrane from the fluorine copolymer composition and a step of converting the sulfonic acid functional group of the fluorine copolymer constituting the fluorine copolymer composition by hydrolysis into sulfonic acid.

Either the membrane formation step or the conversion step may be conducted first, but the conversion step is preferably conducted after the membrane formation step.

The ion exchange membrane of the present embodiment may be a laminate that has a plurality of layers including the fluorine copolymer composition of the present embodiment and in which the ion exchange capacity of the fluorine copolymer of each of the layers may be different, may be a laminate having a layer including the fluorine copolymer composition of the present embodiment and a layer including a fluorine copolymer having a carboxylic acid-type functional group, and may be a laminate having a reinforcing material.

Example of the reinforcing material include woven fabric (cloth), fiber, and non-woven fabric.

The ion exchange membrane of the present embodiment includes the fluorine copolymer composition of the present embodiment. Thus, bubbling and coloration on melt molding is suppressed, and the delamination resistance is improved.

EXAMPLES

Hereinbelow, the present embodiment will now be described in detail by way of Examples and Comparative Examples, but the present embodiment is not limited to these Examples and Comparative Examples in any way.

Hereinbelow, examples corresponding to <<First Embodiment>> are included in <<Example Group 1>>, examples corresponding to <<Second Embodiment>> are included in <<Examples Group 2>>, and each of the example groups will be described. Example numbers imparted to each of the following Examples are unique example numbers for each Example Groups. In other words, for example, Example 1 of Examples according to First Embodiment (<<Example Group 1>>) is distinguished as being different from Example 1 of Examples according to Second Embodiment (<<Example Group 2>>).

<<Example Group 1>>

The evaluation methods in Examples and Comparative Examples are as follows.

[pH]

As the specimen, 50 mL of a first aqueous dispersion or second aqueous dispersion was placed in a polypropylene sample cup and stirred using a magnetic stirrer. The probe of a pH METER D-71 manufactured by HORIBA Scientific was inserted thereto, and when a stable value was achieved, the value was taken as the pH value.

[Amount of Oxygen in System]

The oxygen concentration in the atmosphere in the emulsification step was measured with an oxygen concentration meter OXY-1 manufactured by ICHINEN JIKCO Ltd. placed in the system.

[Amount of Oxygen Dissolved]

As the specimen, 400 mL of the first aqueous dispersion was placed in a polypropylene sample cup and stirred using a magnetic stirrer. The probe of a DO METER OM-71 manufactured by HORIBA Scientific was inserted thereto, and when a stable value was achieved, the value was taken as the amount of oxygen dissolved. In order to avoid a disturbance, the measurement was conducted under the same atmosphere as that for emulsification treatment.

[Contents of $M_1OOCCF_2SO_3M_2$, $Fe^{2+}$, and $Fe^{3+}$]

To determine the content of each of $M_1OOCCF_2SO_3M_2$, $Fe^{2+}$, and $Fe^{3+}$ in the first aqueous dispersion, the specimen was diluted using distilled water to an appropriate concentration, and then, the diluted specimen was filtered with a polytetrafluoroethylene membrane filter having a pore diameter of 200 nm. The filtrate was measured by an ion chromatograph IC-2010 manufactured by TOSOH CORPORATION, and each quantitation was made by an absolute calibration curve method.

[Particle Size]

The first aqueous dispersion or second aqueous dispersion as the specimen was diluted with distilled water such that the scattered light intensity reached an appropriate value. ELSZ-2000ZS manufactured by Otsuka Electronics Co., Ltd. was used to measure the scattered light of the diluted solution, and the cumulant diameter, the volume average particle size, and the number average particle size were determined by a CONTIN method. This procedure was repeated 3 times, the arithmetic averages were each taken as the cumulant diameter, the volume average particle size, and the number average particle size.

[Solid Content Concentration]

The second aqueous dispersion having a mass of w2 [g] was placed in an aluminum dish having a mass of w1 [g] and heated at 200° C. for an hour to remove volatile components. The total mass of the aluminum dish and nonvolatiles after heating were denoted by w3 [g], and the value calculated by the following expression was taken as the solid content concentration.

$$\text{Solid content concentration [\%]}=(w3-w1)/w2*100$$

[Melt Flow Rate]

The melt flow rate was measured in accordance with JIS K7210. That is, 5 g of the specimen was placed in a melt indexer F-F01 manufactured by Toyo Seiki Seisakusho, Ltd., which had been preheated to 270° C., and heated for 5 minutes. A load of 2.16 kg was applied on the melted specimen, and the mass of the resin melted out during 10 minutes from a 2.095 mm pore present in the vertical direction was measured. The measured mass was taken as the melt flow rate.

[Conversion Rate of Fluoroolefin (a) After Polymerization]

5 g of tetrahydrofuran was added to 1 g of the aqueous dispersion and vigorously mixed for 10 minutes to separate and precipitate the copolymer as well as extract the fluoroolefin (a). The extract was filtered with a polytetrafluoroethylene membrane filter having a pore diameter of 200 nm, and 1,2-dimethoxyethane was added thereto as an internal standard. Then, a gas chromatograph GC-2014 manufactured by Shimadzu Corporation was used to quantify the concentration of the fluoroolefin (a) in the extract by an internal calibration curve method. The mass w4 [g] of the fluoroolefin (a) in the aqueous dispersion was calculated from the concentration of the fluoroolefin (a) in the extract. A value calculated by the following expression (2) using the mass w4 [g] and the mass w5 [g] of the fluoroolefin (a) introduced into the polymerization system was taken as the conversion rate.

$$\text{Conversion rate [\%]}=(w5-w4)/w5*100 \quad (2)$$

[Ion Exchange Capacity of Copolymer]

The second aqueous dispersion given in the polymerization step mentioned below was sufficiently purified and dried in the same manner as in the following [Content of Surfactant (c) relative to Copolymer] measurement to thereby give a powder of the copolymer. The powder was press-molded into a film having a thickness of about 130 μm. The infrared transmission spectrum of this film was measured at 29.5±1.5° C. under a nitrogen atmosphere using FT/IR-4200 manufactured by JASCO Corporation. From the intensity ratio between the absorption peak derived from the $SO_2F$ group and the absorption peak derived from the $CF_2$ group in the spectrum given, the proportion A of the $SO_2F$ group in the copolymer [mass %] was determined. The ion exchange capacity was calculated by the following expression using the proportion A.

Ion exchange capacity [meq.]=1,000/(81.1/ A) wherein 81.1 is the formula weight of a $SO_3H$ group provided by hydrolyzing the $SO_2F$ group.

[Content of Surfactant (c) Relative to Copolymer]

The second aqueous dispersion given in the polymerization step mentioned below was treated as follows. That is, the second aqueous dispersion was frozen at −35° C., and the frozen dispersion was thawed at room temperature to give aggregates of the copolymer. This operation confirmed that 99% or more of the copolymer in the second aqueous dispersion was aggregated. The aggregates given were sufficiently washed with a mixed solvent of water, methanol, and methanol/$CF_3CF_2CHFCFHCF_3$ to remove mineral salts, the surfactant, and unreacted fluoroolefin. The copolymer-containing solution given was sufficiently dried in vacuo at 110° C. to give a powder of the copolymer. The mass (g) of the copolymer thus given was measured.

The surface tension of the second aqueous dispersion was measured as mentioned below and compared with the surface tension of a surfactant aqueous solution of known concentration to thereby determine the concentration of the free surfactant present in the water of the second aqueous dispersion. This concentration was subtracted from the amount of the surfactant fed to thereby determine the mass (g) of the surfactant (c) adhering to the surface of particles of the copolymer.

The content of the surfactant (c) relative to the copolymer was calculated by the following expression from the each of the masses determined as described above.

$$\text{Content of the surfactant } (c) \text{ relative to the copolymer}=100\times\text{mass of the surfactant } (c)/\text{mass of the copolymer}$$

[Surface Tension Measurement]

A sample (the second aqueous dispersion or a surfactant aqueous solution of known concentration) was placed in a glass petri dish to a liquid level of 15 mm, and the surface tension was measured by the du Noüy method using a du Noüy Surface Tensiometer D-type manufactured by Ito Seisakusho Co., Ltd. The procedure was repeated 3 times, and the average of the measurements was taken as the surface tension.

[Zeta Potential of Copolymer]

The second aqueous dispersion given in the polymerization step mentioned below was diluted with a 10 mM KCl aqueous solution to a solid content concentration of 1%. The zeta potential of the diluted solution was determined by an electrophoretic light scattering method using ELSZ-2000ZS manufactured by Otsuka Electronics Co., Ltd. The procedure was repeated 3 times, and the arithmetic average of the measurements was taken as the zeta potential.

Example 1

(Emulsification Step)

To 481 g of distilled water, 0.914 g of $CF_3$—$CF_2$—$CF_2$—O—$CF(CF_3)$—$CF_2$—O—$CF(CF_3)$—$COONH_4$, 2.27 g of $Na_2HPO_4·12H_2O$, and 1.35 g of $NaH_2PO_4·2H_2O$ were dissolved, and 120 g of $CF_2$═CF—O—$CF_2$—$CF_2$—$SO_2F$ was further added thereto. The mixed solution described above was stirred with Biomixer ABM-4 manufactured by Nihonseiki Kaisha Ltd. at a peripheral velocity of 40 m/s for 15 minutes while its temperature was kept at 12° C. to give an aqueous dispersion (first aqueous dispersion) as an emulsion. That is, in the emulsification step, the oxygen concentration in the atmosphere was 20.9%, and the temperature of the emulsion was 12° C.

(Polymerization Step)

Then, in a 1 L stainless pressure-resistant reaction vessel, 102 g of water, 1.90 g of $CF_3$—$CF_2$—$CF_2$—O—$CF(CF_3)$—$CF_2$—O—$CF(CF_3)$—$COONH_4$, 0.266 g of $Na_2HPO_4·12H_2O$, and 0.158 g of $NaH_2PO_4·2H_2O$ were added. After the vessel was sufficiently purged with tetrafluoroethylene, the temperature was raised to 50° C., and 71.0 g of the emulsion described above was added thereto. A solution of 0.328 g of $(NH_4OSO_2O)_2$ dissolved in 25.0 g of water, as a polymerization initiator, was pumped thereinto, and polymerization of the emulsified solution given was started. Tetrafluoroethylene was intermittently introduced from outside the system during the reaction so as to retain the pressure at 0.5 MPaG. Pumping of tetrafluoroethylene and the emulsion was continued such that the molar ratio between tetrafluoroethylene and $CF_2$═CF—O—$CF_2$—$CF_2$—$SO_2F$ in the emulsion to be consumed reached 5.00. After 186 g of the emulsion was pumped, unreacted tetrafluoroethylene was purged to finish the polymerization, and an aqueous dispersion including a copolymer (second aqueous dispersion) was given. The emulsified solution subjected to polymerization was drawn out of the system during the reaction, and the pH of the emulsified solution was measured to be 6.5.

(Evaluation)

The first aqueous dispersion and the second aqueous dispersion given above were each subjected to the physical property evaluation mentioned above. The cumulant diameter of the second aqueous dispersion was 111 nm. No corrosion was observed in the reaction vessel after the polymerization was finished, and residues of polytetrafluoroethylene were scarcely observed. The second aqueous dispersion was further left to stand at 5° C. for a week, and the appearance was visually observed. No occurrence of precipitates was observed, and the second aqueous dispersion was evaluated to be in a stable dispersion state. The ion exchange capacity of the copolymer obtained was 1.46 meq./g, and the conversion rate of $CF_2$═CF—O—$CF_2$—$CF_2$—$SO_2F$ was 77%. Various evaluation results are shown in Table 1.

Comparative Example 1

Emulsification and polymerization were conducted in the same manner as in Example 1 except that no emulsification treatment with a Biomixer was conducted.

(Preparation of Mixed Solution)

That is, to 481 g of distilled water, 0.914 g of $CF_3$—$CF_2$—$CF_2$—O—$CF(CF_3)$—$CF_2$—O—$CF(CF_3)$—$COONH_4$, 2.27 g of $Na_2HPO_4·12H_2O$, and 1.35 g of $NaH_2PO_4·2H_2O$ were dissolved, and 120 g of $CF_2$═CF—O—$CF_2$—$CF_2$—$SO_2F$ was further added thereto to provide a mixed solution. That is, the oxygen concentration in the atmosphere during preparation of the mixed solution described above was 20.9%, and the temperature of the mixed solution was 12° C.

The monomer droplets in the above mixed solution were rapidly precipitated without dispersed. Thus, the particle size could not be substantially measured but was evaluated to be of the order of microns or more (more than at least 2,000 nm).

(Polymerization)

Then, in a 1 L stainless pressure-resistant reaction vessel, 102 g of water, 1.90 g of $CF_3$—$CF_2$—$CF_2$—O—$CF(CF_3)$—$CF_2$—O—$CF(CF_3)$—$COONH_4$, 0.266 g of $Na_2HPO_4·12H_2O$, and 0.158 g of $NaH_2PO_4·2H_2O$ were added. After the vessel was sufficiently purged with tetrafluoroethylene, the temperature was raised to 50° C., and 71.0 g of the mixed liquid described above was added thereto. A solution of 0.328 g of $(NH_4OSO_2O)_2$ dissolved in 25.0 g of water, as a polymerization initiator, was pumped thereinto, and polymerization of the solution provided was started. Tetrafluoroethylene was intermittently introduced from outside the system during the reaction so as to retain the pressure at 0.5 MPaG. Pumping of tetrafluoroethylene and the mixed solution was continued such that the molar ratio between tetrafluoroethylene and $CF_2$═CF—O—$CF_2$—$CF_2$—$SO_2F$ in the emulsion to be consumed reached 5.00. After 186 g of the mixed liquid was pumped, unreacted tetrafluoroethylene was purged to finish the polymerization, and an aqueous dispersion was given. The solution subjected to polymerization was drawn out of the system during the reaction, and the pH of the solution was measured to be 6.5.

(Evaluation)

The mixed solution given by the preparation of the mixed solution, as corresponding to the first aqueous dispersion, and the aqueous dispersion given by the polymerization operation described above, as corresponding to the second aqueous dispersion, were each subjected to the physical property evaluation mentioned above as appropriate. The cumulant diameter of the aqueous dispersion given by the polymerization operation was 99 nm. Corrosion was partially observed in the reaction vessel after the polymerization was finished. Residues of polytetrafluoroethylene were scarcely observed. The ion exchange capacity of the copolymer obtained was 1.23 meq./g, and the conversion rate of $CF_2$═CF—O—$CF_2$—$CF_2$—$SO_2F$ was 60%. Various evaluation results are shown in Table 1.

Example 2

(Emulsification Step)

Under a nitrogen atmosphere, $CF_2$═CF—O—$CF_2$—$CF_2$—$SO_2F$ and distilled water from which dissolved oxygen had been removed by nitrogen bubbling were mixed in a mass ratio of 2:1, vigorously stirred for 2 minutes, and then left to stand. The $CF_2$═CF—O—$CF_2$—$CF_2$—$SO_2F$ precipitated was separated. The water washing operation described above was repeated until the concentration of $HOOCCF_2SO_3H$ in the wash water reached 100 ppm or less. To 6,000 g of distilled water, 30.0 g of $CF_3$—$CF_2$—$CF_2$—O—$CF(CF_3)$—$CF_2$—O—$CF(CF_3)$—$COONH_4$, 3.54 g of 85% $H_3PO_4$ (aq.), and 33.9 g of $NaH_2PO_4·2H_2O$ were dissolved, and 2,000 g the $CF_2$═CF—O—$CF_2$—$CF_2$—$SO_2F$ washed with water as described above was added thereto. Under a nitrogen atmosphere having an oxygen concentration of 0.1% or less, the mixed solution described above was stirred with Biomixer ABM-4 manufactured by Nihonseiki Kaisha Ltd. at a peripheral velocity of 40 m/s for 30 minutes while its temperature was kept at 12° C. Further, a solution of 90.0 g of $CF_3$—$CF_2$—$CF_2$—O—$CF(CF_3)$—$CF_2$—O—$CF(CF_3)$—$COONH_4$ dissolved in 2,000 g of distilled water was added thereto to give an aqueous dispersion (first aqueous dispersion) as an emulsion. That is, the oxygen concentration in the atmosphere was 0.1% or less, and the temperature of the emulsion was 12° C.

(Polymerization Step)

In a 22 L stainless pressure-resistant reaction vessel, 2,300 g of water, 24.3 g of $CF_3$—$CF_2$—$CF_2$—O—$CF(CF_3)$—$CF_2$—O—$CF(CF_3)$—$COONH_4$, 1.15 g of 85% $H_3PO_4$ (aq.), and 9.81 g of $NaH_2PO_4 \cdot 2H_2O$ were added. After the vessel was sufficiently purged with tetrafluoroethylene, the temperature was raised to 50° C., and 762 g of the emulsion described above was added thereto. A solution of 1.83 g of $(NH_4OSO_2O)_2$ dissolved in 200 g of distilled water, as a polymerization initiator, was pumped thereinto, and polymerization of the emulsified solution given was started. Tetrafluoroethylene was intermittently introduced from outside the system during the reaction so as to retain the pressure at 0.5 MPaG. After 80 g of tetrafluoroethylene was consumed, a solution of 3.65 g of $(NH_4OSO_2O)_2$ dissolved in 200 g of distilled water was pumped thereinto, and pumping of tetrafluoroethylene and the emulsion was continued such that the molar ratio between tetrafluoroethylene and the monomers in the emulsion to be consumed reached 2.65. After 8,800 g of the emulsion was pumped, unreacted tetrafluoroethylene was purged to finish the polymerization, and an aqueous dispersion including a copolymer (second aqueous dispersion) was given. The emulsified solution subjected to polymerization was drawn out of the system during the reaction, and the pH of the emulsified solution was measured to be 3.5.

(Evaluation 1)

The first aqueous dispersion and the second aqueous dispersion given above were each subjected to the physical property evaluation mentioned above. The cumulant diameter of the second aqueous dispersion was 102 nm. No corrosion was observed in the reaction vessel after the polymerization was finished, and residues of polytetrafluoroethylene were scarcely observed. The second aqueous dispersion was further left to stand at 5° C. for a week, and the appearance was visually observed. No occurrence of precipitates was observed, and the second aqueous dispersion was evaluated to be in a stable dispersion state. The ion exchange capacity of the copolymer obtained was 1.41 meq./g, and the conversion rate of $CF_2$═CF—O—$CF_2$—$CF_2$—$SO_2F$ was 77%. Various evaluation results are shown in Table 1.

(Evaluation 2: Amount of Impurities and Reproducibility)

Polymerization was conducted 3 times under the same conditions as in Example 2, and the ion exchange capacity and the melt flow index were each measured. The standard error of the ion exchange capacity was 0.4%, and the standard error of the melt flow index was 4.3%, calculated from the measurement values.

Separately, polymerization was conducted 3 times in the same manner as in Example 2 except that the water washing operation in Example 2 was not conducted. The ion exchange capacity and the melt flow index were measured, and the standard errors were calculated. The standard error of the ion exchange capacity was 5.4%, and the standard error of the melt flow index was 18.9%. As no water washing operation was conducted, the content of $MOOCCF_2SO_3M$ was 100 ppm or more, and the concentration of dissolved oxygen increased to 4.6 ppm.

As described above, when the amount of various impurities is reduced, it can be seen that the reproducibility of the performance of a copolymer to be given is improved.

Example 3

(Emulsification Step)

To 431 g of distilled water, 0.952 g of $CF_3$—$CF_2$—$CF_2$—O—$CF(CF_3)$—$CF_2$—O—$CF(CF_3)$—$COONH_4$, 2.27 g of $Na_2HPO_4 \cdot 12H_2O$, and 1.37 g of $NaH_2PO_4 \cdot 2H_2O$ were dissolved, and 120 g of $CF_2$═CF—O—$CF_2$—$CF(CF_3)$—O—$CF_2$—$CF_2$—$SO_2F$ further sufficiently washed with water (conducted in the same manner as in Example 2) was added thereto. The mixed solution described above was stirred with Biomixer ABM-4 manufactured by Nihonseiki Kaisha Ltd. at a peripheral velocity of 40 m/s for 15 minutes while its temperature was kept at 12° C. to give an aqueous dispersion (first aqueous dispersion) as an emulsion. That is, in the emulsification step, the oxygen concentration in the atmosphere was 20.9%, and the temperature of the emulsion was 12° C.

(Polymerization Step)

In a 1 L stainless pressure-resistant reaction vessel, the emulsion described above and 2.41 g of $CF_3$—$CF_2$—$CF_2$—O—$CF(CF_3)$—$CF_2$—O—$CF(CF_3)$—$COONH_4$ were added. After the vessel was sufficiently purged with tetrafluoroethylene, the temperature was raised to 50° C. A solution of 0.710 g of $(NH_4OSO_2O)_2$ dissolved in 50.0 g of water, as a polymerization initiator, was pumped thereinto, and polymerization of the emulsified solution given was started. Tetrafluoroethylene was intermittently introduced from outside the system during the reaction so as to retain the pressure at 0.5 MPaG. 260 minutes after the polymerization was started, unreacted tetrafluoroethylene was purged to finish the polymerization, and an aqueous dispersion including a copolymer (second aqueous dispersion) was given. The emulsified solution subjected to polymerization was drawn out of the system during the reaction, and the pH of the emulsified solution was measured to be 6.7.

(Evaluation)

The first aqueous dispersion and the second aqueous dispersion given above were each subjected to the physical property evaluation mentioned above. No corrosion was observed in the reaction vessel after the polymerization was finished, and residues of polytetrafluoroethylene were scarcely observed. The second aqueous dispersion was further left to stand at 5° C. for a week, and the appearance was visually observed. No occurrence of precipitates was observed, and the second aqueous dispersion was evaluated to be in a stable dispersion state. The ion exchange capacity of the copolymer obtained was 1.62 meq./g, and the conversion rate of $CF_2$═CF—O—$CF_2$—$CF(CF_3)$—O—$CF_2$—$CF_2$—$SO_2F$ was 91%. Various evaluation results are shown in Table 1.

Comparative Example 2

Emulsification and polymerization were conducted in the same manner as in Example 3 except that no emulsification treatment with a Biomixer was conducted.

(Preparation of Mixed Solution)

To 431 g of distilled water, 0.952 g of $CF_3$—$CF_2$—$CF_2$—O—$CF(CF_3)$—$CF_2$—O—$CF(CF_3)$—$COONH_4$, 2.27 g of $Na_2HPO_4 \cdot 12H_2O$, and 1.37 g of $NaH_2PO_4 \cdot 2H_2O$ were dissolved, and 120 g of $CF_2$═CF—O—$CF_2$—$CF(CF_3)$—O—$CF_2$—$CF_2$—$SO_2F$ further sufficiently washed with water (conducted in the same manner as in Example 2) was added thereto to provide a mixed solution. That is, the oxygen concentration in the atmosphere during preparation of the mixed solution described above was 20.9%, and the temperature of the mixed solution was 12° C.

The monomer droplets in the above mixed solution were rapidly precipitated without dispersed. Thus, the particle size could not be substantially measured but was evaluated to be of the order of microns or more (more than at least 2,000 nm).

(Polymerization)

In a 1 L stainless pressure-resistant reaction vessel, the mixed solution described above and 2.41 g of $CF_3$—$CF_2$—$CF_2$—O—$CF(CF_3)$—$CF_2$—O—$CF(CF_3)$—$COONH_4$ were added. After the vessel was sufficiently purged with tetrafluoroethylene, the temperature was raised to 50° C. A solution of 0.710 g of $(NH_4OSO_2O)_2$ dissolved in 50.0 g of water, as a polymerization initiator, was pumped thereinto, and polymerization of the solution provided was started. Tetrafluoroethylene was intermittently introduced from outside the system during the reaction so as to retain the pressure at 0.5 MPaG. 260 minutes after the polymerization was started, unreacted tetrafluoroethylene was purged to finish the polymerization to give an aqueous dispersion. The solution subjected to polymerization was drawn out of the system during the reaction, and the pH of the solution was measured to be 6.7.

(Evaluation)

The mixed solution given by the preparation of the mixed solution, as corresponding to the first aqueous dispersion, and the aqueous dispersion given by the polymerization operation described above, as corresponding to the second aqueous dispersion, were each subjected to the physical property evaluation mentioned above, as appropriate. The cumulant diameter of the aqueous dispersion given by the polymerization operation was 35 nm. No corrosion was observed in the reaction vessel after the polymerization was finished, but many residues of polytetrafluoroethylene were observed. The copolymer obtained had no heat meltability, and it was not possible to form a film therefrom. Thus, the ion exchange capacity could not be measured. The conversion rate of $CF_2$═CF—O—$CF_2$—$CF(CF_3)$—O—$CF_2$—$CF_2$—$SO_2F$ was only 6%. Various evaluation results are shown in Table 1.

Example 4

(Emulsification Step)

To 294 g of distilled water, 0.503 g of $CF_3$—$CF_2$—$CF_2$—O—$CF(CF_3)$—$CF_2$—O—$CF(CF_3)$—$COONH_4$, 1.39 g of $Na_2HPO_4 \cdot 12H_2O$, and 0.827 g of $NaH_2PO_4 \cdot 2H_2O$ were dissolved, and 147 g of $CF_2$═CF—O—$CF_2$—$CF(CF_3)$—O—$CF_2$—$CF_2$—$SO_2F$ further sufficiently washed with water (conducted in the same manner as in Example 2) was added thereto. The mixed solution described above was stirred with Biomixer ABM-4 manufactured by Nihonseiki Kaisha Ltd. at a peripheral velocity of 40 m/s for 15 minutes while its temperature was kept at 12° C. to give an aqueous dispersion (first aqueous dispersion) as an emulsion. That is, in the emulsification step, the oxygen concentration in the atmosphere was 20.9%, and the temperature of the emulsion was 12° C.

(Polymerization Step)

In a 1 L stainless pressure-resistant reaction vessel, 92 g of water, 1.41 g of $CF_3$—$CF_2$—$CF_2$—O—$CF(CF_3)$—$CF_2$—O—$CF(CF_3)$—$COONH_4$, 0.525 g of $Na_2HPO_4 \cdot 12H_2O$, and 0.312 g of $NaH_2PO_4 \cdot 2H_2O$ were added. After the vessel was sufficiently purged with tetrafluoroethylene, the temperature was raised to 50° C., and 21.2 g of the emulsion described above was added thereto. A solution of 1.13 g of $(NH_4OSO_2O)_2$ dissolved in 25 g of water, as a polymerization initiator, was pumped thereinto, and polymerization of the emulsified solution given was started. Tetrafluoroethylene was intermittently introduced from outside the system during the reaction so as to retain the pressure at 0.2 MPaG. Pumping of tetrafluoroethylene and the emulsion was continued such that the molar ratio between tetrafluoroethylene and the monomers in the emulsion to be consumed reached 4.06. After 420 g of the emulsion was pumped, unreacted tetrafluoroethylene was purged to finish the polymerization, and an aqueous dispersion including a copolymer (second aqueous dispersion) was given. The emulsified solution subjected to polymerization was drawn out of the system during the reaction, and the pH of the emulsified solution was measured to be 6.7.

(Evaluation)

The first aqueous dispersion and the second aqueous dispersion given above were each subjected to the physical property evaluation mentioned above. No corrosion was observed in the reaction vessel after the polymerization was finished, and residues of polytetrafluoroethylene were scarcely observed. The second aqueous dispersion was further left to stand at 5° C. for a week, and the appearance was visually observed. No occurrence of precipitates was observed, and the second aqueous dispersion was evaluated to be in a stable dispersion state. The ion exchange capacity of the copolymer obtained was 1.13 meq./g, the conversion rate of $CF_2$═CF—O—$CF_2$—$CF(CF_3)$—O—$CF_2$—$CF_2$—$SO_2F$ was 90%, and the solid content concentration in the polymerization solution was 38%. Various evaluation results are shown in Table 1.

Comparative Example 3

In the emulsification step in Example 1, sulfuric acid was used instead of $Na_2HPO_4 \cdot 12H_2O$ and $NaH_2PO_4 \cdot 2H_2O$, and the pH of the mixed solution given was adjusted to 1.7. As a result, two-layer separation considered as protonation of the surfactant was observed, and the fluoroolefin (a) was not emulsified. Accordingly, the evaluation showed that it was difficult to conduct polymerization using the mixed solution.

Example 5

(Emulsification Step)

To 8,400 g of distilled water, 112.5 g of $CF_3$—$CF_2$—$CF_2$—O—$CF(CF_3)$—$CF_2$—O—$CF(CF_3)$—$COONH_4$, 4.45 g of 85% $H_3PO_4$ (aq.), and 42.4 g of $NaH_2PO_4 \cdot 2H_2O$ were dissolved, and 2,500 g of $CF_2$═CF—O—$CF_2$—$CF(CF_3)$—O—$CF_2$—$CF_2$—$SO_2F$ further sufficiently washed with water (conducted in the same manner as in Example 2) was added thereto. Under a nitrogen atmosphere having an oxygen concentration of 0.1% or less, the mixed solution described above was stirred with Biomixer ABM-4 manufactured by Nihonseiki Kaisha Ltd. at a peripheral velocity of 40 m/s for 60 minutes while its temperature was kept at 12° C. Further, a solution of 112.5 g of $CF_3$—$CF_2$—$CF_2$—O—$CF(CF_3)$—$CF_2$—O—$CF(CF_3)$—$COONH_4$ dissolved in 1,600 g of distilled water was added thereto to give an aqueous dispersion (first aqueous dispersion) as an emulsion. That is, in the emulsification step, the oxygen concentration in the atmosphere was 0.1% or less, and the temperature of the emulsion was 12° C.

(Polymerization Step)

In a 22 L stainless pressure-resistant reaction vessel, 2,700 g of water, 15.1 g of $CF_3$—$CF_2$—$CF_2$—O—$CF(CF_3)$—$CF_2$—O—$CF(CF_3)$—$COONH_4$, 1.31 g of 85% $H_3PO_4$ (aq.), and 11.1 g of $NaH_2PO_4 \cdot 2H_2O$ were added. After the vessel was sufficiently purged with tetrafluoroethylene, the temperature was raised to 50° C., and 381 g of the emulsion described above was added thereto. A solution of 3.65 g of $(NH_4OSO_2O)_2$ dissolved in 100 g of distilled water, as a polymerization initiator, was pumped thereinto, and polymerization of the emulsified solution given was started. Tetrafluoroethylene was intermittently introduced from outside the system during the reaction so as to retain the pressure at 0.2 MPaG. After 84 g of tetrafluoroethylene was consumed, a solution of 3.65 g of $(NH_4OSO_2O)_2$ dissolved in 100 g of distilled water was pumped thereinto, and pumping of tetrafluoroethylene and the emulsion was continued such that the molar ratio between tetrafluoroethylene and the monomers in the emulsion to be consumed reached 4.74. After 10,747 g of the emulsion was pumped, unreacted tetrafluoroethylene was purged to finish the polymerization, and an aqueous dispersion including a copolymer (second aqueous dispersion) was given. The emulsified solution subjected to polymerization was drawn out of the system during the reaction, and the pH of the emulsified solution was measured to be 3.3.

(Evaluation)

The first aqueous dispersion and the second aqueous dispersion given above were each subjected to the physical property evaluation mentioned above. The cumulant diameter of the second aqueous dispersion was 106 nm. No corrosion was observed in the reaction vessel after the polymerization was finished, and residues of polytetrafluoroethylene were scarcely observed. The second aqueous dispersion was further left to stand at 5° C. for a week, and the appearance was visually observed. No occurrence of precipitates was observed, and the second aqueous dispersion was evaluated to be in a stable dispersion state. The ion exchange capacity of the copolymer obtained was 1.03 meq./g, and the conversion rate of $CF_2$═CF—O—$CF_2$—$CF(CF_3)$—O—$CF_2$—$CF_2$—$SO_2F$ was 94%. Various evaluation results are shown in Table 1.

Example 6

(Emulsification Step)

To 6,000 g of distilled water, 30.0 g of $CF_3CF_2CF_2$—O—$CF(CF_3)$—$CF_2$—O—$CF(CF_3)$—$COONH_4$, 3.55 g of 85% $H_3PO_4$ (aq.), and 33.9 g of $NaH_2PO_4 \cdot 2H_2O$ were dissolved, and 2,000 g of $CF_2$═CF—O—$CF_2$—$CF_2$—$SO_2F$ further sufficiently washed with water (conducted in the same manner as in Example 2) was added thereto. Under a nitrogen atmosphere having an oxygen concentration of 0.1% or less, the mixed solution described above was stirred with Biomixer ABM-4 manufactured by Nihonseiki Kaisha Ltd. at a peripheral velocity of 40 m/s for 30 minutes while its temperature was kept at 12° C. Further, a solution of 90.1 g of $CF_3$—$CF_2$—$CF_2$—O—$CF(CF_3)$—$CF_2$—O—$CF(CF_3)$—$COONH_4$ dissolved in 2,000 g of distilled water was added thereto to give an aqueous dispersion (first aqueous dispersion) as an emulsion. That is, in the emulsification step, the oxygen concentration in the atmosphere was 0.1% or less, and the temperature of the emulsion was 12° C.

(Polymerization Step)

In a 22 L stainless pressure-resistant reaction vessel, 2,300 g of water, 24.3 g of $CF_3$—$CF_2$—$CF_2$—O—$CF(CF_3)$—$CF_2$—O—$CF(CF_3)$—$COONH_4$, 1.15 g of 85% $H_3PO_4$ (aq.), and 9.82 g of $NaH_2PO_4 \cdot 2H_2O$ were added. After the vessel was sufficiently purged with tetrafluoroethylene, the temperature was raised to 50° C., and 762 g of the emulsion described above was added thereto. A solution of 1.83 g of $(NH_4OSO_2O)_2$ dissolved in 200 g of distilled water, as a polymerization initiator, was pumped thereinto, and polymerization of the emulsified solution given was started. Tetrafluoroethylene was intermittently introduced from outside the system during the reaction so as to retain the pressure at 0.5 MPaG. After 79 g of tetrafluoroethylene was consumed, a solution of 3.65 g of $(NH_4OSO_2O)_2$ dissolved in 200 g of distilled water was pumped thereinto, and pumping of tetrafluoroethylene and the emulsion was continued such that the molar ratio between tetrafluoroethylene and the monomers in the emulsion to be consumed reached 2.65. After 8,790 g of the emulsion was pumped, the reaction was conducted for further 90 minutes with supply of the emulsion and tetrafluoroethylene stopped, unreacted tetrafluoroethylene was purged to finish the polymerization, and an aqueous dispersion including a copolymer (second aqueous dispersion) was given. The emulsified solution subjected to polymerization was drawn out of the system during the reaction, and the pH of the emulsified solution was measured to be 3.7.

(Evaluation 1)

The first aqueous dispersion and the second aqueous dispersion given above were each subjected to the physical property evaluation mentioned above. The cumulant diameter of the second aqueous dispersion was 113 nm. No corrosion was observed in the reaction vessel after the polymerization was finished, and residues of polytetrafluoroethylene were scarcely observed. The second aqueous dispersion was further left to stand at 5° C. for a week, and the appearance was visually observed. No occurrence of precipitates was observed, and the second aqueous dispersion was evaluated to be in a stable dispersion state. The ion exchange capacity of the copolymer obtained was 1.25 meq./g, the conversion rate of $CF_2$═CF—O—$CF_2$—$CF_2$—$SO_2F$ was 94%, the solid content concentration in the polymerization solution was 32%, and the zeta potential of the fluoropolymer was −66 mV. Various evaluation results are shown in Table 1.

Example 7

(Emulsification Step)

To 480 g of distilled water, 7.20 g of $CF_3$—$CF_2$—$CF_2$—O—$CF(CF_3)$—$CF_2$—O—$CF(CF_3)$—$COONH_4$, 0.213 g of 85% $H_3PO_4$ (aq.), and 2.03 g of $NaH_2PO_4 \cdot 2H_2O$ were dissolved, and 240 g of $CF_2$═CF—O—$CF_2$—$CF(CF_3)$—O—$CF_2$—$CF_2$—$SO_2F$ further sufficiently washed with water (conducted in the same manner as in Example 2) was added thereto. Under a nitrogen atmosphere having an oxygen concentration of 0.1% or less, the mixed solution described above was stirred with Biomixer ABM-4 manufactured by Nihonseiki Kaisha Ltd. at a peripheral velocity of 40 m/s for 10 minutes while its temperature was kept at 12° C. to give an aqueous dispersion (first aqueous dispersion) as an emulsion. That is, in the emulsification step, the oxygen concentration in the atmosphere was 0.1% or less, and the temperature of the emulsion was 12° C.

(Polymerization Step)

In a 1 L stainless pressure-resistant reaction vessel, 99.0 g of water, 0.518 g of $CF_3$—$CF_2$—$CF_2$—O—$CF(CF_3)$—$CF_2$—O—$CF(CF_3)$—$COONH_4$, 0.044 g of 85% $H_3PO_4$ (aq.), and 0.420 g of $NaH_2PO_4 \cdot 2H_2O$ were added. After the vessel was sufficiently purged with tetrafluoroethylene, the temperature was raised to 50° C., and 13.6 g of the emulsion described above was added thereto. A solution of 0.123 g of $(NH_4OSO_2O)_2$ dissolved in 6 g of distilled water, as a polymerization initiator, was pumped thereinto, and polymerization of the emulsified solution given was started. Tetrafluoroethylene was intermittently introduced from outside the system during the reaction so as to retain the pressure at 0.2 MPaG. After 3.1 g of tetrafluoroethylene was consumed, a solution of 0.246 g of $(NH_4OSO_2O)_2$ dissolved in 6 g of distilled water was pumped thereinto, and pumping of tetrafluoroethylene and the emulsion was continued such that the molar ratio between tetrafluoroethylene and the monomers in the emulsion to be consumed reached 6.48. After 428 g of the emulsion was pumped, unreacted tetrafluoroethylene was purged to finish the polymerization, and an aqueous dispersion including a copolymer (second aqueous dispersion) was given. The emulsified solution subjected to polymerization was drawn out of the system during the reaction, and the pH of the emulsified solution was measured to be 3.3.

(Evaluation)

The first aqueous dispersion and the second aqueous dispersion given above were each subjected to the physical property evaluation mentioned above. The cumulant diameter of the second aqueous dispersion was 136 nm. No corrosion was observed in the reaction vessel after the polymerization was finished, and residues of polytetrafluoroethylene were scarcely observed. The second aqueous dispersion was further left to stand at 5° C. for a week, and the appearance was visually observed. No occurrence of precipitates was observed, and the second aqueous dispersion was evaluated to be in a stable dispersion state. The ion exchange capacity of the copolymer obtained was 1.05 meq./g, the conversion rate of $CF_2{=}CF{-}O{-}CF_2{-}CF(CF_3){-}O{-}CF_2{-}CF_2{-}SO_2F$ was 92%, the solid content concentration in the polymerization solution was 39%, and the zeta potential of the fluoropolymer was −59 mV. Various evaluation results are shown in Table 1.

TABLE 1

| | First aqueous dispersion | | | | | |
|---|---|---|---|---|---|---|
| | Cumulant diameter of first aqueous dispersion (nm) | pH | Amount of $M_1OOCCF_2SO_3M_2$ (ppm) | Amount of $Fe^{2+}$ and $Fe^{3+}$ (ppm) | Amount of dissolved oxygen (ppm) | Volume average particle size/ number average particle size |
| Example 1 | 1255 | 5.7 | 100 or more | 0.1 or less | 4.6 | 1.0 |
| Example 2 | 1034 | 3.5 | 20 or less | 0.1 or less | 0.2 | 1.0 |
| Example 3 | 400 | 6.7 | 20 or less | 0.1 or less | 5.0 | 1.4 |
| Example 4 | 533 | 6.7 | 20 or less | 0.1 or less | 5.2 | 1.4 |
| Example 5 | 465 | 3.3 | 20 or less | 0.1 or less | 0.1 | 1.5 |
| Example 6 | 1034 | 3.7 | 20 or less | 0.1 or less | 0.2 | 1.0 |
| Example 7 | 605 | 3.3 | 20 or less | 0.1 or less | 0.1 | 1.2 |
| Comparative Examples 1 | Unmeasurable | 5.7 | 100 or more | 0.1 or less | 4.6 | Unmeasurable |
| Comparative Examples 2 | Unmeasurable | 6.7 | 20 or less | 0.1 or less | 4.6 | Unmeasurable |
| Comparative Examples 3 | Unmeasurable | 1.7 | Unmeasurable | Unmeasurable | Unmeasurable | Unmeasurable |

| | Second aqueous dispersion | | | | | |
|---|---|---|---|---|---|---|
| | Solid content concentration of second aqueous dispersion (%) | Content of surfactant (c) relative to copolymer (%) | pH | Ion exchange capacity of copolymer obtained (meq./g) | Fluoroolefin conversion rate (%) | Reaction vessel corrosion: Yes/No |
| Example 1 | 19 | 1.9 | 6.1 | 1.46 | 77 | No |
| Example 2 | 24 | 4.0 | 2.9 | 1.41 | 77 | No |
| Example 3 | 22 | 2.5 | 4.0 | 1.62 | 91 | No |
| Example 4 | 38 | 0.7 | 2.0 | 1.13 | 90 | No |
| Example 5 | 27 | 3.3 | 3.0 | 1.03 | 94 | No |
| Example 6 | 32 | 2.8 | 2.8 | 1.25 | 94 | No |
| Example 7 | 39 | 1.8 | 2.5 | 1.05 | 92 | No |
| Comparative Examples 1 | 18 | 2.0 | 6.1 | 1.23 | 60 | Yes |
| Comparative Examples 2 | 32 | 5.3 | 6.5 | Unmeasurable | 6 | No |
| Comparative Examples 3 | Unmeasurable | Unmeasurable | Unmeasurable | Unmeasurable | Unmeasurable | Unmeasurable |

<<Example Group 2>>

The methods for measuring physical properties and methods for evaluating characteristics in Examples and Comparative Examples were as follows.

[Methods for Measuring Physical Properties]

(Method for Measuring Content of Low-Molecular Compound (B))

To the fluorine polymer composition (mass: W1), 5 times by mass of methanol/$CF_3CHFCHFCF_2CF_3$ (hereinbelow, also referred to as "solvent A") (2/1 (volume ratio)) were added, and the mixture was refluxed at 50° C. for an hour.

The filtrate collected by suction filtration was concentrated under reduced pressure and dried in vacuo with an evaporator to give a dried product. From the mass of the dried product (W2), the extracted low-molecular compound (B) was quantified.

Subsequently, droplets of the filtrate were applied to a NaCl plate and dried 10 times to prepare a sample for infrared transmission spectrum measurement. The infrared transmission spectrum of this sample was measured at 29.5±1.5° C. under a nitrogen atmosphere using FT/IR-4200 manufactured by JASCO Corporation.

The spectrum given was separated into peaks each having a maximum around 1790 $cm^{-1}$ (derived from the ester group), a maximum at 1770 $cm^{-1}$, and a maximum around 1810 $cm^{-1}$ (derived from the carboxyl group), the resulting peak areas were each denoted as A, B, and C, and 100×A/(A+B+C) was defined as the esterification rate (%).

Amount of low-molecular compound quantified×esterification rate was defined as the content of low-molecular compound (B).

(Method for Measuring Content of Low-Molecular Compound (C))

According to the same approach as in the method for measuring the content of the low-molecular compound (B) described above, the content of the low-molecular compound (C) was quantified, and infrared transmission spectrum measurement was conducted. The spectrum given was separated into peaks each having a maximum around 1790 $cm^{-1}$ (derived from the ester group), a maximum at 1770 $cm^{-1}$, and a maximum around 1810 $cm^{-1}$ (derived from the carboxyl group), the resulting peak areas were each denoted as A, B, and C, and (B+C)/(A+B+C) was defined as the carboxylic acid group rate.

Amount of low-molecular compound quantified×carboxylic acid group rate was defined as the content of low-molecular compound (C).

[Method for Evaluating Characteristics]

(Evaluation of Delamination Properties of Ion Exchange Membrane)

The delamination resistance of the ion exchange membranes prepared in Examples and Comparative Examples mentioned below was evaluated as follows.

The delamination resistance was evaluated by observing the ion exchange membrane subjected to electrolysis and measuring the area rate of a portion at which delamination between layers had occurred.

First, the electrolyzer for use in electrolysis was one in which four electrolysis cells of a type that forcedly circulates an electrolyte solution (forced circulation-type) were arranged in series, each of which had a structure including an ion exchange membrane disposed between an anode and a cathode.

The distance between the anode and the cathode in the electrolysis cells was set to 1.5 mm. As the cathode, used was an electrode including nickel expanded metal coated with nickel oxide as a catalyst. As the anode, used was an electrode including titanium expanded metal coated with ruthenium, iridium, and titanium as catalysts.

Saline was supplied to the anode side such that a concentration of 23 g/L was maintained, and sodium hydroxide at a concentration of 25 mass % was supplied to the cathode side.

No water was supplied to the cathode side during electrolysis.

The temperature of saline was set to 90° C., and electrolysis was performed for 40 hours at the current density was 4 $kA/m^2$ under conditions where the fluid pressure on the cathode side of the electrolyzer was 5.3 kPa higher than the fluid pressure on the anode side.

The area of the conductive portion of the ion exchange membrane after subjected to electrolysis was denoted by x ($cm^2$), the area at which delamination occurred was denoted by y ($cm^2$), and the area rate of the delamination portion A represented by the following expression was calculated.

$$A=y/x\times 100 \quad (\%)$$

The area y was measured using image analysis software (UMO2-SUZ-01 manufactured by SCALAR CORPORATION).

In delamination resistance evaluation, a case of the area rate of the delamination portion A of less than 5% was evaluated as ○, a case of the area rate of 5% or more and less than 25% was evaluated as Δ, and a case of the area rate of 25% or more was evaluated as X.

(Evaluation of Initial Foamability of Ion Exchange Membrane)

Each of the fluorine copolymer compositions given in Examples and Comparative Examples mentioned below was left to stand (preheated) at 270° C. and 3 MPa for 4 minutes and heat-pressed at 13 MPa for 1 minute to thereby prepare an ion exchange membrane of a size of 30 mm×30 mm and a thickness of about 1 mm.

The ion exchange membrane was visually observed and evaluated based on the following criteria.

⊚: There is no bubbling (number of bubbles: 0).

○: Bubbling was slightly observed (number of bubbles: less than 5).

Δ: Some bubbling was observed (number of bubbles: 5 to less than 10).

x: Much bubbling was observed (number of bubbles: 10 or more).

(Evaluation of Moisture Absorption Foamability of Ion Exchange Membrane)

Each of the fluorine copolymer compositions given in Examples and Comparative Examples mentioned below was left to stand under constant temperature and humidity (25° C., 50%) for 10 days, then left to stand (preheated) at 270° C. and 3 MPa for 4 minutes, and heat-pressed at 13 MPa for 1 minute to thereby prepare an ion exchange membrane of a size of 30 mm×30 mm and a thickness of about 1 mm.

The ion exchange membrane was visually observed and evaluated based on the following criteria.

⊚: There is no bubbling (number of bubbles: 0).

○: Bubbling was slightly observed (number of bubbles: less than 5).

Δ: Some bubbling was observed (number of bubbles: 5 or more and less than 10).

X: Much bubbling was observed (number of bubbles: 10 or more).

The ion exchange membrane (laminated membrane) for characteristic evaluation described above was prepared as follows.

First, as raw material monomers, the following monomers A to C were provided.

Monomer A: TFE

Monomer B: $CF_2{=}CFOCF_2CF(CF_3)OCF_2CF_2CO_2CH_3$

Monomer C: $CF_2{=}CFOCF_2CF(CF_3)OCF_2CF_2SO_2F$

Next, as the raw material for a first layer (polymer composition for first layer), the monomer A and the monomer B were copolymerized in a substance ratio of 11:1 to prepare a polymer composition including a fluorine copolymer (fluorine copolymer having a carboxylic acid-type functional group).

As the raw material for a second layer (polymer composition for second layer), a mixture of a fluorine-containing copolymer obtained by copolymerizing the monomer A and the monomer B in a substance ratio of 6.5:1 (fluorine-containing copolymer having a carboxylic acid-type functional group) and a fluorine-containing copolymer obtained by copolymerizing the monomer A and the monomer C in a substance ratio of 5.8:1 (fluorine-containing copolymer having a sulfonic acid-type functional group) was prepared.

Additionally, as the raw material for a third layer (polymer composition for third layer), each of the fluorine copolymer compositions given in Examples 1 to 6 and Comparative Examples 1 to 2 was used.

The polymer composition for first layer and the polymer composition for second layer were coextruded with an apparatus equipped with 2 extruders, a coextrusion T die for 2 layers, and a take-up machine, to give a two-layer film (a) having a thickness of 70 μm. As a result of observing the cross section of the two-layer film (a), the thickness of the first layer was 16.5 μm, and the thickness of the second layer was 53.5 μm.

Further, the polymer composition for third layer was used to give a third layer film (b) as a single layer having a thickness of 50 μm by means of a single-layer T die.

As for reinforcing material, a 100-denier polytetrafluoroethylene (PTFE) tape yarn twisted 900 times/m into a thread form as a reinforcement yarn, 30-denier, 6-filament polyethylene terephthalate (PET) twisted 200 times/m as a warp yarn, and a 35-denier, 8-filament PET thread twisted 10 times/m as a weft yarn of a sacrifice yarn were prepared. These yarns were plain-woven in an alternate arrangement such that the PTFE yarn was 24 counts/inch and the sacrifice yarn was 4 times PTFE, i.e., 64 counts/inch, to give a woven fabric having a thickness of 100 μm. The resulting woven fabric was pressure-bonded with a heated metal roll to regulate the thickness of the woven fabric to 70 μm. At this time, the aperture ratio of the PTFE yarn alone was 75%.

On a drum having a heat source and a vacuum source inside and having a large number of micropores in the surface, an air-permeable, heat-resistant release paper, the third layer film (b), a woven fabric, and the two-layer film (a) with the second layer facing the woven fabric side were laminated in this order and integrated into a single body while eliminating air between the materials at a temperature of 230° C. under a reduced pressure of −650 mmHg to give a laminated membrane.

This laminated membrane was hydrolyzed at a temperature of 95° C. for 30 minutes in an aqueous solution containing 5.0 mass % of dimethyl sulfoxide (DMSO) and 6.5 N of KOH and then subjected to equilibrium treatment under 90° C. conditions using a 0.5 N NaOH solution. After washing with water, the membrane was subjected to equilibrium treatment at a temperature of 90° C. in a 0.1 N caustic soda aqueous solution.

A polymer composition having sulfonic acid group, which had an equivalent mass of 910 and was obtained by hydrolyzing a copolymer of $CF_2{=}CF_2$ and $CF_2{=}CFOCF_2CF(CF_3)O(CF_2)_2SO_2F$, was dissolved in a 50/50 parts by mass mixed solution of water and ethanol in an amount of 10 mass % to give a solution.

Zirconium oxide having a primary particle size of 0.02 μm was added to the solution in an amount of 40 mass %, and homogeneously dispersed with a ball mill to give a suspension. This suspension was applied to both surfaces of the equilibrium-treated laminated membrane by a spray method and dried to thereby form coating layers, and the ion exchange membrane for evaluation described above was given.

Example 1

(Step I: Step of Preparing Pre-Emulsion)

9.6 kg of water, 2.4 kg of $CF_2{=}CFOCF_2CF_2SO_2F$ as a perfluorovinyl compound, 4.25 g of a 85% phosphoric acid aqueous solution, 40.7 g of sodium dihydrogen phosphate, and 28.8 g of $CF_3CF_2CF_2OCF(CF_3)CF_2OCF(CF_3)COONH_4$ were mixed to prepare a pre-emulsion using a homogenizer.

(Step II: Polymerization Step)

In a stainless steel reactor (autoclave) having an internal volume of 22 L (liters), 2.5 kg of water, 1.16 g of a 85% phosphoric acid aqueous solution, 1.1 g of sodium dihydrogen phosphate, and 31.6 g of $CF_3CF_2CF_2OCF(CF_3)CF_2OCF(CF_3)COONH_4$ were fed, the inside of the reactor was sufficiently substituted with nitrogen and substituted with TFE, and then the temperature was raised until the internal temperature of the reactor reached 50° C.

Subsequently, 863 g of the pre-emulsion and 200 g of an ammonium persulfate aqueous solution (4.2 mass %) as a polymerization initiator were fed thereto, TFE was fed until the internal pressure of the reactor reached 0.5 MPaG, and polymerization was started. TFE was continuously added during the polymerization reaction such that the pressure was retained at 0.5 MPaG. When the amount of TFE introduced since the start of the reaction reached 36 g, 200 g of ammonium persulfate aqueous solution (8.4 mass %) was fed, and continuous addition of the pre-emulsion (28.6 g/min) was started. When the amount of the pre-emulsion introduced since the start of the reaction reached 11.0 kg, introduction of the pre-emulsion was stopped, and the reactor was cooled to 25° C. Then, unreacted TFE was released out of the system to finish the polymerization, and a polymerization solution was given.

(Step III: Salting-Out Step)

1.59 kg of the polymerization solution given above was diluted with 1.59 kg of distilled water, and this diluted solution was warmed to 35° C. under stirring. To this solution, 1.35 kg of 1.41 M ammonium sulfate water was added dropwise over 1 hour. After the dropwise addition was finished, the solution was stirred at 5° C. for 2 hours to give a salted-out slurry.

This salted-out slurry was filtered, distilled water in an amount of 3 times in terms of polymer was added thereto. The liquid was stirred at room temperature for 10 minutes and subjected to $N_2$ pressure filtration (0.2 MPaG). This operation was repeated 7 times.

(Step IV: Solvent Washing Step)

Then, methanol in an amount of 3 times by mass the amount of polymer was added thereto. The mixture was stirred at room temperature for 20 minutes and then subjected to $N_2$ pressure filtration (0.2 MPaG). This methanol washing was repeated (7 times in total).

(Step V: Step of Contacting with Ortho Ester)

Subsequently, trimethyl orthoformate in an amount of 3 times by mass the amount of polymer was added thereto, and the mixture was heated at 90° C. for 8 hours under stirring. Thereafter, the mixture was subjected to $N_2$ pressure filtration (0.2 MPaG). Then, methanol in an amount of 3 times by mass the amount of polymer was added thereto, and the mixture was stirred at room temperature for 20 minutes and then subjected to $N_2$ pressure filtration (0.2 MPaG). This methanol washing was repeated (3 times in total) to give a wet polymer.

(Step VI: Drying Step)

After (Step V), the given wet polymer was coarse dried with a $N_2$ gas flow and further heat dried in vacuo (100° C., 0.1 kPa, 5 hours) in a shelf dryer, and the dried polymer (fluorine copolymer composition) was collected.

The obtained dried polymer was subjected to the quantification and measurement mentioned above.

Additionally, an ion exchange membrane prepared using the dried polymer was subjected to the evaluation mentioned above. The measurement and evaluation results are shown in Table 2.

Example 2

A dried polymer was obtained by the same operation as in Example 1 except that triethyl orthoformate was used instead of trimethyl orthoformate in Step (V).

The obtained dried polymer was subjected to the quantification and measurements mentioned above.

Additionally, an ion exchange membrane prepared using the dried polymer was subjected to the evaluation mentioned above. The measurement and evaluation results are shown in Table 2.

Example 3

A dried polymer was obtained by the same operation as in Example 1 except that the given wet polymer was coarse dried with a $N_2$ gas flow after Step (IV), and Step (V) and later were conducted.

The obtained dried polymer was subjected to the quantification and measurements mentioned above.

Additionally, an ion exchange membrane prepared using the dried polymer was subjected to the evaluation mentioned above. The measurement and evaluation results are shown in Table 2.

Example 4

Methanol in an amount of 3 times by mass the amount of polymer, instead of trimethyl orthoformate, was measured in Step (V), and concentrated sulfuric acid was added dropwise thereto to prepare 0.5% sulfuric acid methanol. A dried polymer was obtained by the same operation as in Example 1 except that the given sulfuric acid methanol was added to the polymer and the mixture was heated at 65° C. for 8 hours under stirring.

The obtained dried polymer was subjected to the quantification and measurements mentioned above.

Additionally, an ion exchange membrane prepared using the dried polymer was subjected to the evaluation mentioned above. The measurement and evaluation results are shown in Table 2.

Comparative Example 1

In Example 1, Step (IV) and Step (V) were not conducted, the operation proceeded to Step (VI), and then Step (V) was conducted. Step (VI) was conducted again to obtain a dried polymer.

The obtained dried polymer was subjected to the quantification and measurements mentioned above.

Additionally, an ion exchange membrane prepared using the dried polymer was subjected to the evaluation mentioned above. The measurement and evaluation results are shown in Table 2.

Comparative Example 2

In Example 1, Step (IV) and Step (V) were not conducted, the operation proceeded to Step (VI), and then the obtained dried polymer was pelletized at 240° C. in a single-screw extrusion kneader. Step (V) and Step (VI) were conducted on the polymer in the form of pellets to obtain a dried polymer.

The obtained dried polymer was subjected to the quantification and measurements mentioned above.

Additionally, an ion exchange membrane prepared using the dried polymer was subjected to the evaluation mentioned above. The measurement and evaluation results are shown in Table 2.

TABLE 2

| Items | | | Example 1 | Example 2 | Example 3 | Example 4 | Comparative Examples 1 | Comparative Examples 2 |
|---|---|---|---|---|---|---|---|---|
| Production conditions | Step V | Solvent content of fluorine copolymer composition (mass %) | 25 | 25 | 10 | 25 | 0 | 0 |
| | | Contact solvent | Trimethyl orthoformate | Triethyl orthoformate | Trimethyl orthoformate | Methanol | Trimethyl orthoformate | Trimethyl orthoformate |
| Amount of residue | | Low-molecular compound (B) content (ppm) | 300 | 330 | 340 | 300 | 710 | 820 |
| | | Low-molecular compound (C) content (ppm) | 140 | 130 | 120 | 220 | 270 | 420 |
| Results | Delamination property evaluation | | ○ | ○ | ○ | ○ | Δ | X |
| | Foamability evaluation | Initial foamability | ◎ | ◎ | ◎ | ◎ | Δ | Δ |
| | | Moisture absorption foamability | ◎ | ◎ | ◎ | ○ | Δ | X |

The present application is based on a Japanese Patent Application filed on Dec. 28, 2020 (Japanese Patent Application No. 2020-218480), a Japanese Patent Application filed on Jun. 29, 2021 (Japanese Patent Application No. 2021-107187), and a Japanese Patent Application filed on Oct. 25, 2021 (Japanese Patent Application No. 2021-173658), the contents of which are hereby incorporated by reference.

INDUSTRIAL APPLICABILITY

The aqueous dispersion of a fluoroolefin (first aqueous dispersion) and the aqueous dispersion of a copolymer of a fluoroolefin (second aqueous dispersion) according to the first embodiment of the present invention can be suitably utilized for ion exchange membrane applications.

The fluorine polymer composition according to the second embodiment of the present invention has industrial applicability in the field of salt electrolysis.

The invention claimed is:

1. An aqueous dispersion comprising:

a fluoroolefin (a) represented by the following general formula (1);

a surfactant (c) represented by the following general formula (2); and a dispersion medium comprising water, wherein the aqueous dispersion has a cumulant diameter of 250 to 2,000 nm, and the aqueous dispersion has a pH of 2.0 to 7.0:

$$CF_2{=}CF{-}[O{-}CF_2{-}CF(CF_3)]_n{-}O{-}[CF_2]_m{-}Z \quad (1)$$

wherein n represents an integer of 0 or more and 2 or less, m represents an integer of 2 or more and 4 or less, and Z represents $SO_2F$ or $COOCH_3$, and $$CF_3{-}[CF_2]_{m'}{-}O{-}[CF(CF_3){-}CF_2{-}O]_{n'}{-}CF(CF_3){-}Z' \quad (2)$$

wherein m' represents an integer of 0 to 2, n' represents an integer of 0 to 6, Z' represents COOM, wherein M represents H, Li, Na, K, or $NR_4$, where R represents H or a linear alkyl group having 1 to 4 carbon atoms, wherein a value obtained by dividing a volume average particle size of the aqueous dispersion by a number average particle size thereof is 2.0 or less.

2. The aqueous dispersion according to claim 1, wherein the dispersion medium has a global warming potential of less than 1,000.

3. The aqueous dispersion according to claim 1, wherein the fluoroolefin (a) comprises at least one fluoroolefin (a') selected from $CF_2{=}CF{-}O{-}CF_2{-}CF_2{-}SO_2F$, $CF_2{=}CF{-}O{-}CF_2{-}CF_2{-}CF_2{-}CF_2{-}SO_2F$, $CF_2{=}CF{-}O{-}CF_2{-}CF(CF_3){-}O{-}CF_2{-}CF_2{-}SO_2F$, and $CF_2{=}CF{-}O{-}CF_2{-}CF(CF_3){-}O{-}CF_2{-}CF_2{-}COOCH_3$, and a content of the fluoroolefin (a') is 15 to 40 mass %.

4. The aqueous dispersion according to claim 1, wherein the surfactant (c) comprises $CF_3{-}CF_2{-}CF_2{-}O{-}CF(CF_3){-}CF_2{-}O{-}CF(CF_3){-}COOM$ or $CF_3{-}CF_2{-}CF_2{-}O{-}CF(CF_3){-}CF_2{-}O{-}CF(CF_3){-}CF_2{-}O{-}CF(CF_3){-}CF_2{-}O{-}CF(CF_3){-}CF_2{-}O{-}CF(CF_3){-}COOM$, wherein M represents H, Li, Na, K, or $NR_4$, wherein R represents H or a linear alkyl group having 1 to 4 carbon atoms.

5. The aqueous dispersion according to claim 1, wherein a content of $M_1OOCCF_2SO_3M_2$, wherein $M_1$ and $M_2$ each independently represent H, Li, Na, K or $NR_4$, wherein R represents H or a linear alkyl group having 1 to 4 carbon atoms, in the aqueous dispersion is 100 ppm or less.

6. The aqueous dispersion according to claim 1, wherein a total amount of $Fe^{2+}$ and $Fe^{3+}$ in the aqueous dispersion is 1 ppm or less, and an amount of dissolved oxygen in the aqueous dispersion is 1 ppm or less.

7. A method for producing the aqueous dispersion according to claim 1, comprising:

emulsifying by shearing a mixed solution comprising water, the surfactant (c), and the fluoroolefin (a) at a peripheral velocity of 20 to 50 m/s.

8. The production method according to claim 7, wherein, in the emulsifying, an oxygen concentration in an atmosphere is set to 0.1% or less, and a solution temperature of the mixed solution is set to 20° C. or less.

9. The aqueous dispersion of claim 1, wherein the cumulant diameter is 533 to 2,000 nm.

* * * * *